(12) United States Patent
Ohno et al.

(10) Patent No.: US 10,339,811 B2
(45) Date of Patent: *Jul. 2, 2019

(54) IMAGE PROCESSING APPARATUS, ELECTRONIC APPARATUS, AND IMAGE PROCESSING METHOD

(71) Applicant: FUJITSU TEN LIMITED, Kobe-shi, Hyogo (JP)

(72) Inventors: Yasuhiro Ohno, Kobe (JP); Yukisuke Ozaki, Kobe (JP); Takayoshi Yamashita, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/727,167

(22) Filed: Jun. 1, 2015

(65) Prior Publication Data

US 2015/0262488 A1    Sep. 17, 2015

Related U.S. Application Data

(63) Continuation of application No. 13/322,712, filed as application No. PCT/JP2010/059069 on May 28, 2010, now Pat. No. 9,077,861.

(30) Foreign Application Priority Data

May 29, 2009 (JP) .................... 2009-130102
Mar. 9, 2010 (JP) .................... 2010-052210

(51) Int. Cl.
*G08G 1/16*    (2006.01)
*B60R 1/00*    (2006.01)
(Continued)

(52) U.S. Cl.
CPC ............. *G08G 1/167* (2013.01); *B60R 1/00* (2013.01); *G06T 3/4038* (2013.01);
(Continued)

(58) Field of Classification Search
CPC .............. B60R 1/00; B60R 2300/303; B60R 2300/806; G08G 1/165; G08G 1/167; G08G 1/0962; H04N 7/181; G06T 3/4038
See application file for complete search history.

(56) References Cited

U.S. PATENT DOCUMENTS 6,515,597 B1 * 2/2003 Wada ................ B60K 35/00
   340/439
6,911,997 B1 * 6/2005 Okamoto .............. B60R 1/00
   348/148
(Continued)

FOREIGN PATENT DOCUMENTS

EP    1179958 A1    2/2002
JP    H10-151995 A    6/1998
(Continued)

OTHER PUBLICATIONS

Sep. 7, 2010 Search Report issued in International Application No. PCT/JP2010/059069.
(Continued)

*Primary Examiner* — Dave Czekaj
*Assistant Examiner* — Berteau Joisil
(74) *Attorney, Agent, or Firm* — Oliff PLC

(57) ABSTRACT

A technology for displaying images on a displaying apparatus mounted on a vehicle is provided. In response to a predetermined instruction signal, synthetic images viewed from a virtual viewpoint around and above the periphery of the vehicle are generated based on a plurality of images acquired from a plurality of cameras for capturing the periphery of the vehicle. The plurality of synthetic images,
(Continued)

Figure 1:
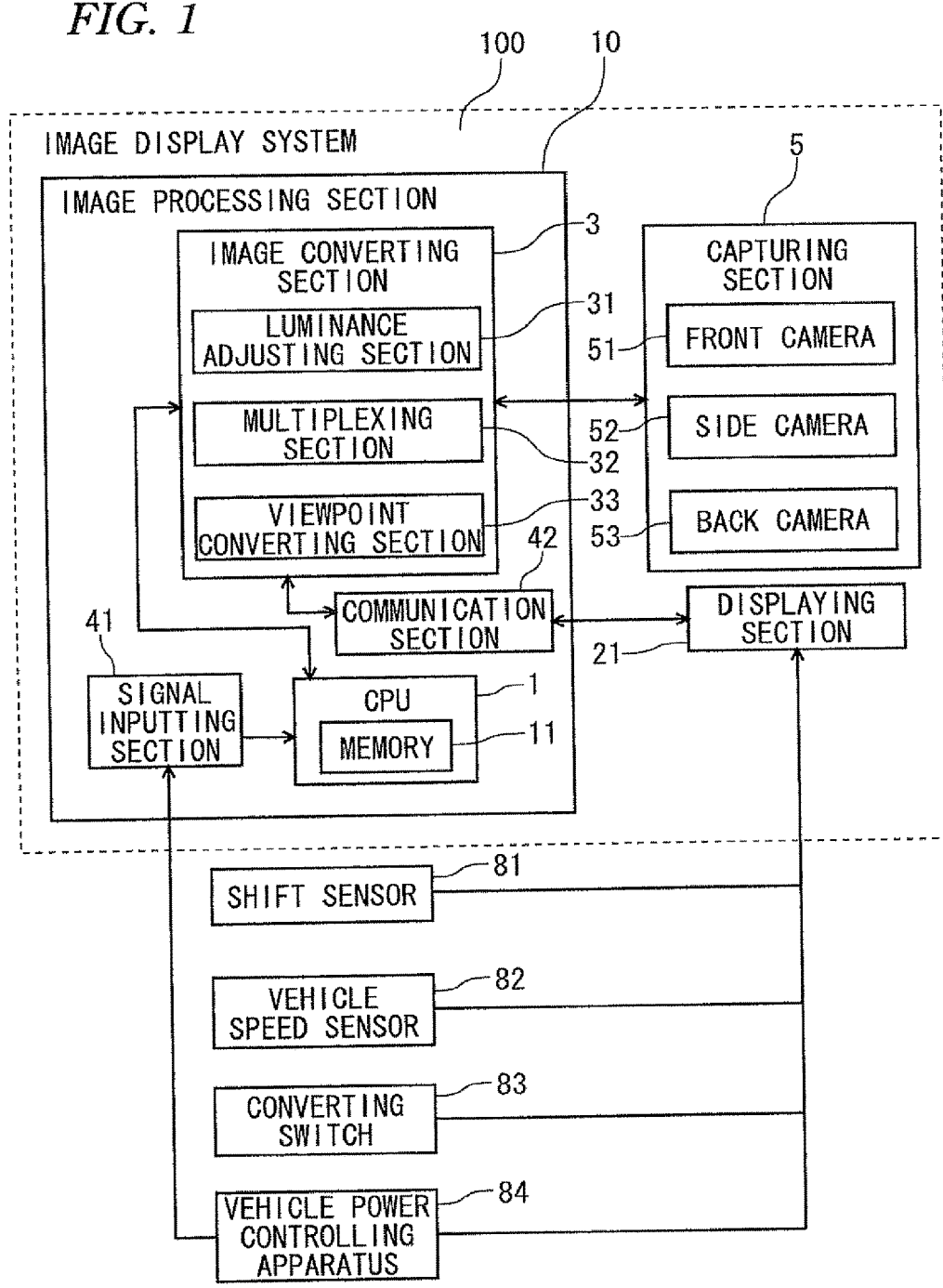

in which a position of a viewpoint moves sequentially varies such that the synthetic images move in a circle around the vehicle, are sequentially output to the displaying apparatus. Accordingly, the user monitors the entire circumference of the vehicle from the viewpoint where the user sees the vehicle in front of user's eyes, so that the user can intuitively recognize the positional relation between the vehicle and an obstacle from one screen.

9 Claims, 14 Drawing Sheets

(51) Int. Cl.
  *H04N 7/18*   (2006.01)
  *G06T 3/40*   (2006.01)
  *G08G 1/0962*   (2006.01)
(52) U.S. Cl.
  CPC ........... *G08G 1/0962* (2013.01); *G08G 1/165* (2013.01); *G08G 1/166* (2013.01); *G08G 1/168* (2013.01); *H04N 7/18* (2013.01); *H04N 7/181* (2013.01); *B60R 2300/303* (2013.01); *B60R 2300/602* (2013.01); *B60R 2300/806* (2013.01)

(56) References Cited

U.S. PATENT DOCUMENTS

| | | | |
|---|---|---|---|
| 7,161,616 B1* | 1/2007 | Okamoto | B60R 1/00 348/148 |
| 2003/0021490 A1* | 1/2003 | Okamoto | B60R 1/00 382/284 |
| 2003/0197660 A1* | 10/2003 | Takahashi | G06K 9/00791 345/7 |
| 2003/0206166 A1 | 11/2003 | Kamata et al. | |
| 2010/0245573 A1 | 9/2010 | Gomi et al. | |

FOREIGN PATENT DOCUMENTS

| | | |
|---|---|---|
| JP | H11-249556 A | 9/1999 |
| JP | 2001-236418 A | 8/2001 |
| JP | 3300334 B2 | 7/2002 |
| JP | 2002-342408 A | 11/2002 |
| JP | 2002-366976 A | 12/2002 |
| JP | 2004-185054 A | 7/2004 |
| JP | 2006-027307 A | 2/2006 |
| JP | 2008-211417 A | 9/2008 |
| JP | 2008-219559 A | 9/2008 |
| JP | 2008-236403 A | 10/2008 |
| JP | 2009-035024 A | 2/2009 |
| JP | 2010-231276 A | 10/2010 |
| WO | 00/64175 A1 | 10/2000 |
| WO | 2009/016917 A1 | 2/2009 |

OTHER PUBLICATIONS

Feb. 18, 2014 Office Action issued in Japanese Application No. 2010-052210.
Dec. 3, 2013 Office Action issued in Chinese Application No. 201080023657.X.
Aug. 7, 2014 Office Action issued in Chinese Application No. 201080023657.X.
Jan. 26, 2015 Office Action issued in Chinese Application No. 201080023657.X.
Feb. 9, 2016 Office Action issued in Japanese Patent Application No. 2014-199076.
Feb. 23, 2016 Office Action issued in Japanese Patent Application No. 2014-199077.
Jul. 7, 2015 Office Action issued in Japanese Patent Application No. 2014-199075.
Jul. 7, 2015 Office Action issued in Japanese Patent Application No. 2014-199076.
Aug. 18, 2015 Office Action issued in Japanese Patent Application No. 2014-199077.

\* cited by examiner

IMAGE PROCESSING APPARATUS, ELECTRONIC APPARATUS, AND IMAGE PROCESSING METHOD

CONTINUITY DATA

This is a Continuation of application Ser. No. 13/322,712 filed Nov. 28, 2011, which in turn is a is a National Phase of Application No. PCT/JP2010/059069, which claims the benefit of Japanese Application No. 2010-052210 filed Mar. 9, 2010, and Japanese Application No. 2009-130102 filed May 29, 2009. The disclosure of the prior applications is hereby incorporated by reference herein in its entirety.

TECHNICAL FIELD

The present invention relates to a technology for displaying an image on a display apparatus mounted on a vehicle.

Generally, there has been known an apparatus enabling vehicle periphery monitoring by acquiring images of the periphery of the vehicle by means of a plurality of cameras mounted on the vehicle, and displaying the images on a display apparatus in an automatic manner or through user's operation. There also has been known an apparatus for providing a means enabling a user to confirm safety of an entire circumference of a vehicle, by displaying an image looking down the vehicle from a virtual viewpoint directly above the vehicle. In addition, there has been known an art, which captures images at a viewpoint having a predetermined height by using a plurality of cameras mounted on a vehicle and implements confirming safety of the vehicle periphery from two screens, i.e., a first screen, which displays a viewpoint position of the images captured by the cameras together with an overall view of the vehicle, and an OLE_LINK1 second screen, which displays each of the images captured by the cameras in correspondence with movement of the OLE_LINK1 viewpoint position displayed on the first screen (for example, refer to Patent Document 1).

RELATED ART

Patent Document

Patent Document 1: Japanese Patent Application Publication No. 2008-219559

DISCLOSURE OF THE INVENTION

Technical Problems to be Solved by the Invention

However, in the related art for displaying images of the vehicle periphery by means of a plurality of cameras, it has been necessary to recognize to which direction of the vehicle each of the images captured by the plurality of cameras corresponds. Since the screen does not display the user's vehicle, the user could not have easily recognized a positional relation, such as a distance, between the vehicle and an obstacle around the vehicle.

In the related art for displaying an image looking down the vehicle from a virtual viewpoint directly above the vehicle on a screen, the user needs to recognize the broad range of the entire circumference of the vehicle at once. Since the user should recognize the overly much information, he/she would have difficulty in condensing points to decide to where the user should pay attention.

The art disclosed in Patent Document 1 separately displays the screen, which displays the position of the viewpoint of the images captured by the cameras together with the overall view of the vehicle, and the screen, which displays each of the images of the cameras in correspondence with movement of the position of the viewpoint. Accordingly, since the user should associate the information displayed on the two screens with each other, he/she cannot easily recognize the positional relation between the vehicle and an obstacle.

The present invention has been made in consideration of the circumferences, and its object is to provide a technology enabling a user to intuitively recognize a positional relation between a vehicle and an obstacle around the vehicle.

Means to Solve the Problems

The object of the present invention is accomplished by the configuration set forth below.

(1) An image processing apparatus that processes an image to be displayed on a display apparatus mounted on a vehicle, the image processing apparatus comprising: a receiving section that receives an instruction signal; a synthetic image generating section that generates a plurality of first synthetic images based on a plurality of images of the periphery of the vehicle captured by a plurality of cameras, the first synthetic images being viewed to the vehicle, from a plurality of virtual viewpoints disposed around and above the vehicle; and an output section that sequentially outputs the plurality of first synthetic images to the display apparatus in response to the instruction signal, such that a virtual viewpoint moves in a circle in a continuous manner.

(2) In the image processing apparatus described in (1) above, the synthetic image generating section generates a second synthetic image being viewed to the vehicle from a virtual viewpoint disposed directly above substantially a center of the vehicle. The output section sequentially outputs the plurality of first synthetic images and the second synthetic image to the display apparatus, such that the virtual viewpoint moves in a continuous manner between the plurality of first synthetic images and the second synthetic image.

(3) In the image processing apparatus described in (2) above, the output section outputs the second synthetic image after outputting the plurality of first synthetic images.

(4) In the image processing apparatus described in any one of (1) to (3) above, the synthetic image generating section generates the plurality of first synthetic images such that the virtual viewpoint moves in a circle around a position of the vehicle.

(5) In the image processing apparatus described in any one of (1) to (3) above, the synthetic image generating section generates the plurality of first synthetic images such that the viewpoint moves in a circle around a user-specified position of the vehicle.

(6) In the image processing apparatus described in any one of (1) to (5) above, the receiving section receives the instruction signal when the image processing apparatus is activated.

(7) An electronic apparatus that processes an image to be displayed on a display apparatus mounted on a vehicle, the electronic apparatus comprising: an operating section that outputs an instruction signal; a receiving section that receives the instruction signal; a synthetic image generating section that generates a synthetic image based on a plurality of images of the periphery of the vehicle captured by a plurality of cameras, the synthetic image being viewed to the vehicle from a virtual viewpoint disposed around and above the vehicle such that the virtual viewpoint moves in a circle in a continuous manner; and an output section that outputs the synthetic image to the display apparatus in response to the instruction signal.

(8) The electronic apparatus described in (7) above further includes the display apparatus that displays the synthetic image output from the output section.

(9) An image processing method for processing an image to be displayed on a display apparatus mounted on a vehicle, the image processing method comprising: receiving an instruction signal; generating a plurality of synthetic images based on a plurality of images of the periphery of the vehicle captured by a plurality of cameras, the synthetic images being viewed to the vehicle from a plurality of virtual viewpoints disposed around and above the vehicle; and sequentially outputting the synthetic images to the display apparatus in response to the instruction signal, such that a virtual viewpoint moves in a circle in a continuous manner.

Effect of the Invention

According to the configuration of (1) to (9) above, the display apparatus displays the plurality of synthetic images presented to move along the circumference of the vehicle in the state that the vehicle is looked down. Accordingly, the user monitors the entire circumference of the vehicle from the viewpoint where the user sees the vehicle in the front of his/her eyes, so that the user can intuitively recognize a positional relation between the vehicle and an obstacle from one screen.

According to the configuration of (2) above, the virtual viewpoint moves in a continuous manner such that both the plurality of synthetic images presented to move in a circle around the vehicle and the synthetic image viewed from above the vehicle are displayed. Accordingly, the user can intuitively recognize the positional relation between the vehicle and an obstacle from one screen. Safety of the vehicle periphery can be confirmed from the plurality of viewpoints around and above the vehicle.

According to the configuration of (3) above, even if there has been information about an obstacle or others that the user has overlooked from the images of the periphery of the vehicle, the safety can be confirmed again by the image of the top part of the vehicle that is sequentially displayed after the images of the periphery of the vehicle. The user does not need to recognize the broad range of the entire circumference of the vehicle at once. The image of the broad range of the entire vehicle from the top part of the vehicle is sequentially displayed after the images of the limited range of the vehicle periphery, so that the user can more surely confirm the safety of the vehicle periphery from one screen.

According to the configuration of (4) above, the synthetic images viewed from a virtual viewpoint moving in sequence around a position of the vehicle are generated, so that the user can intuitively recognize an obstacle around the entire circumference of the vehicle from one screen.

According to the configuration of (5) above, the user specifies a position in the vicinity of the vehicle, such that the user can confirm, from one screen, the safety based on any position in the vicinity of the vehicle where the user desires to confirm.

According to the configuration of (6) above, the user can monitor the periphery of the vehicle from one screen when the image processing apparatus is activated.

BRIEF DESCRIPTIONS OF DRAWINGS

Figure 2:
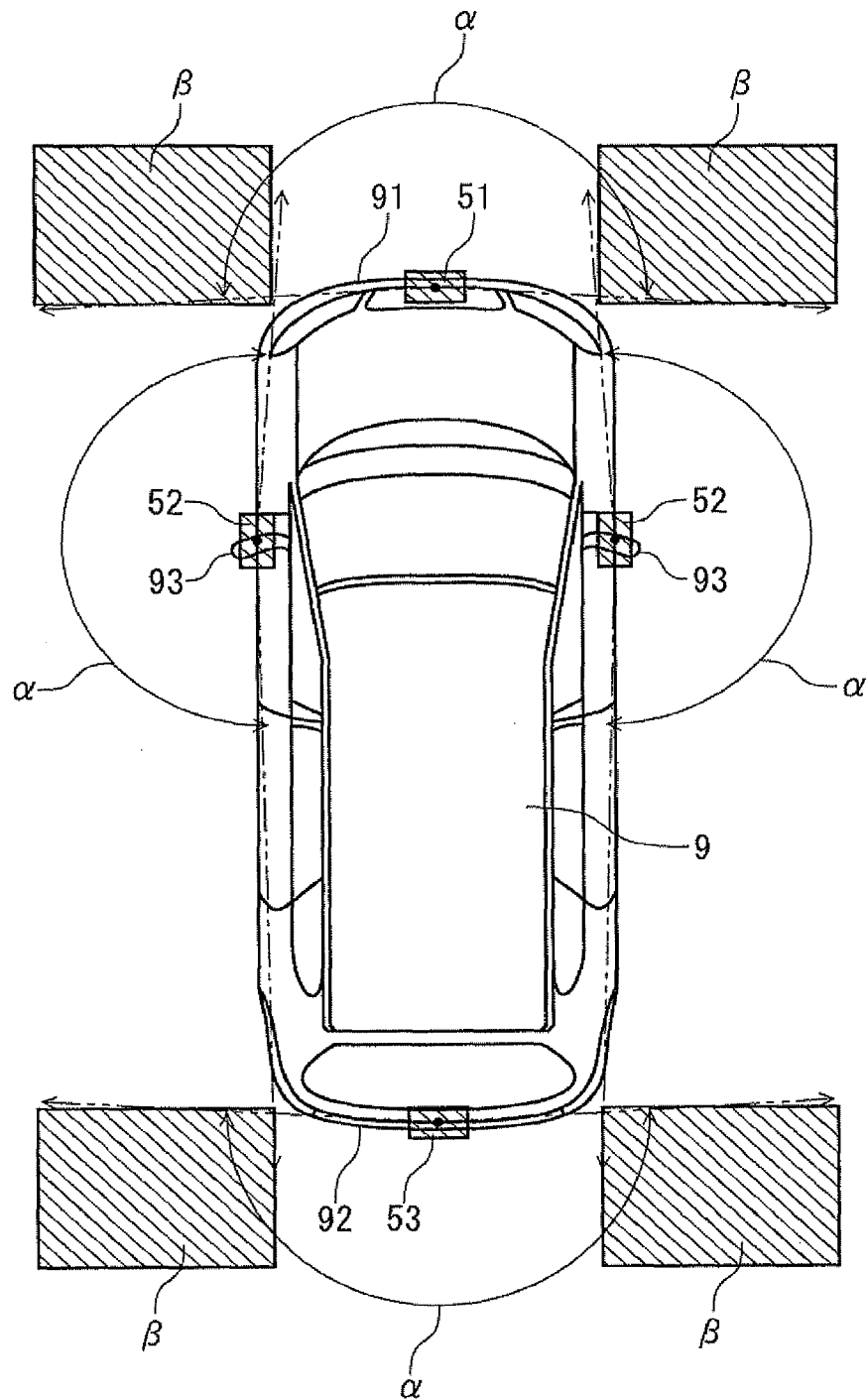
Figure 3:
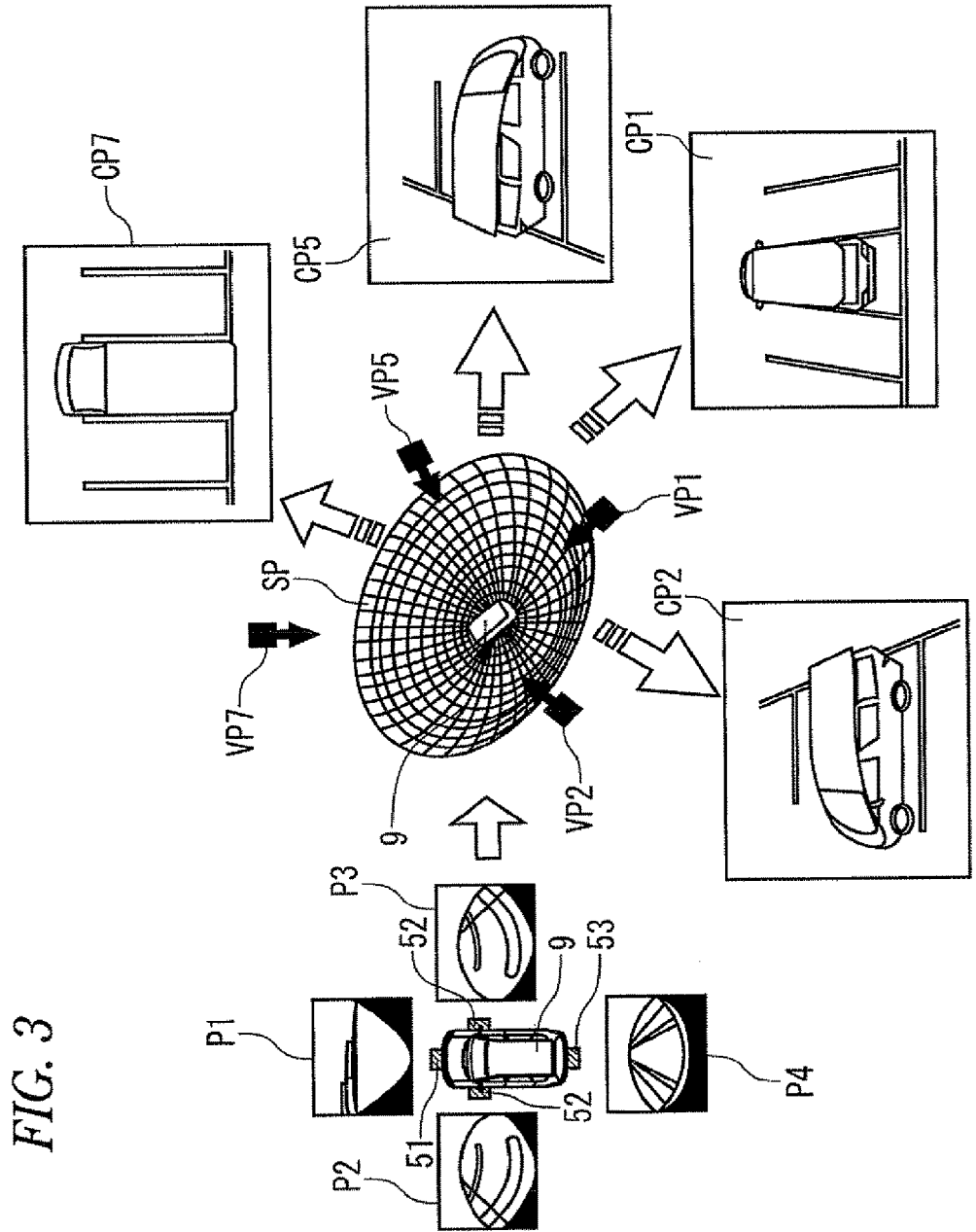
Figure 4:
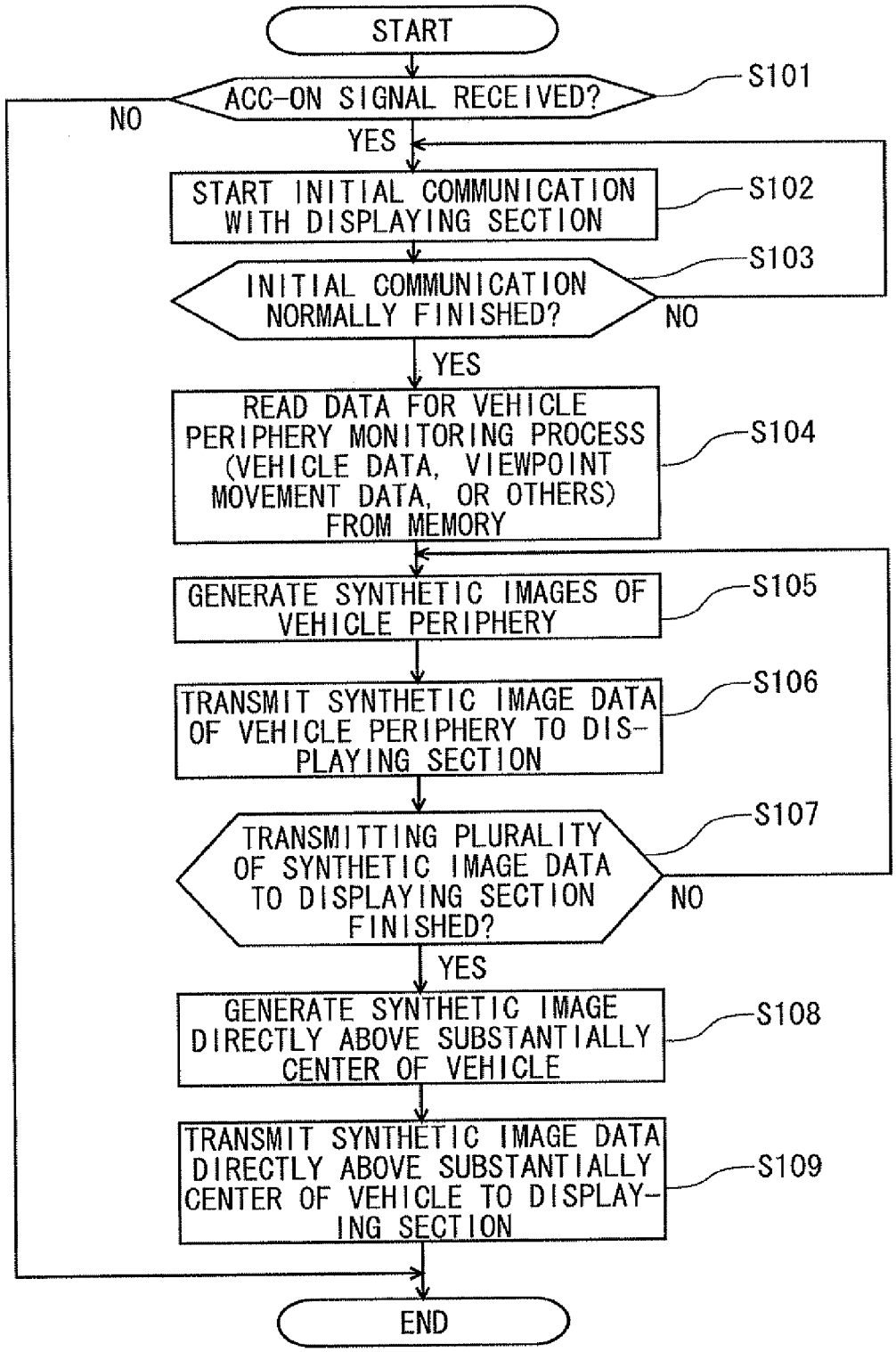
Figure 5:
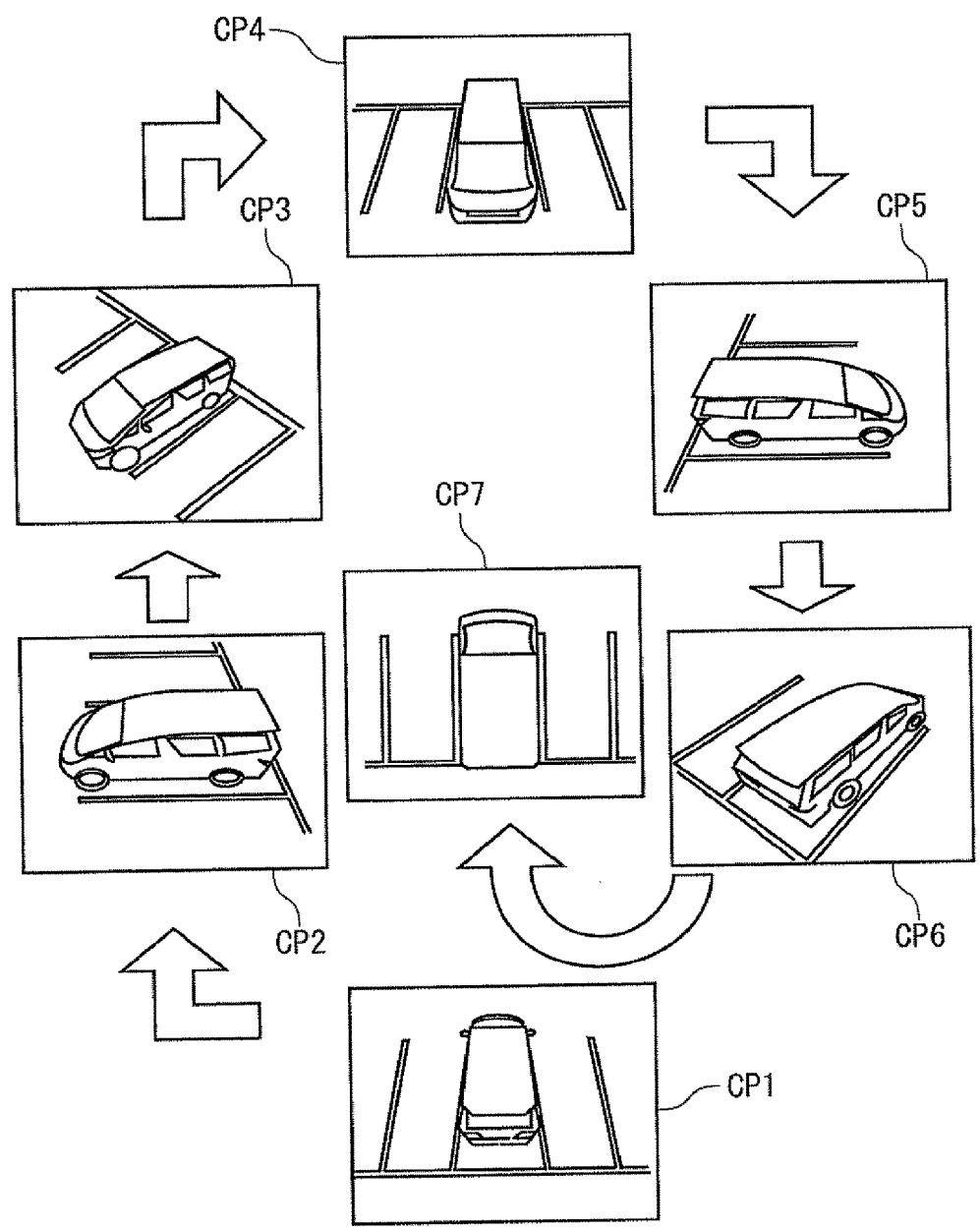
Figure 6:
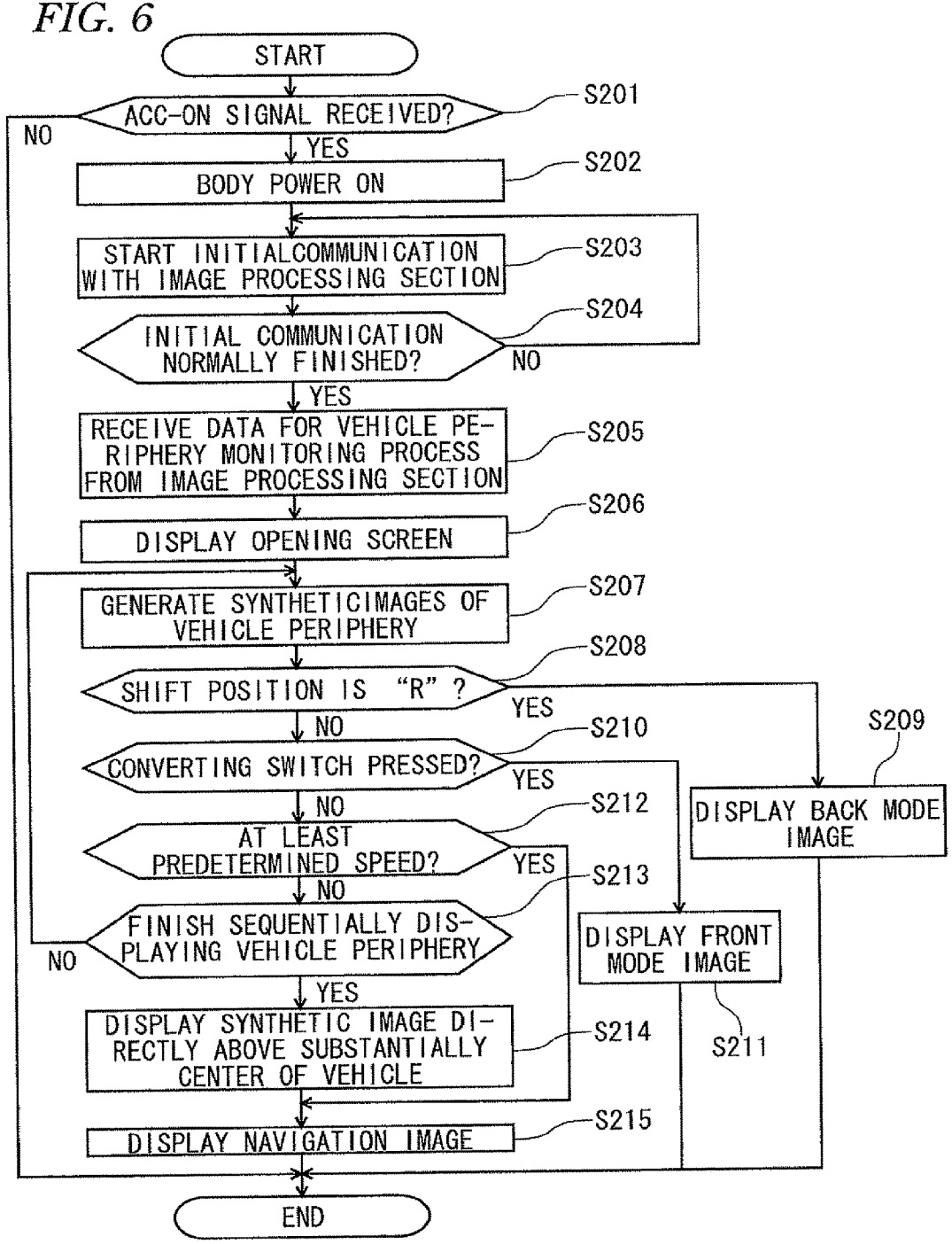
Figure 7:
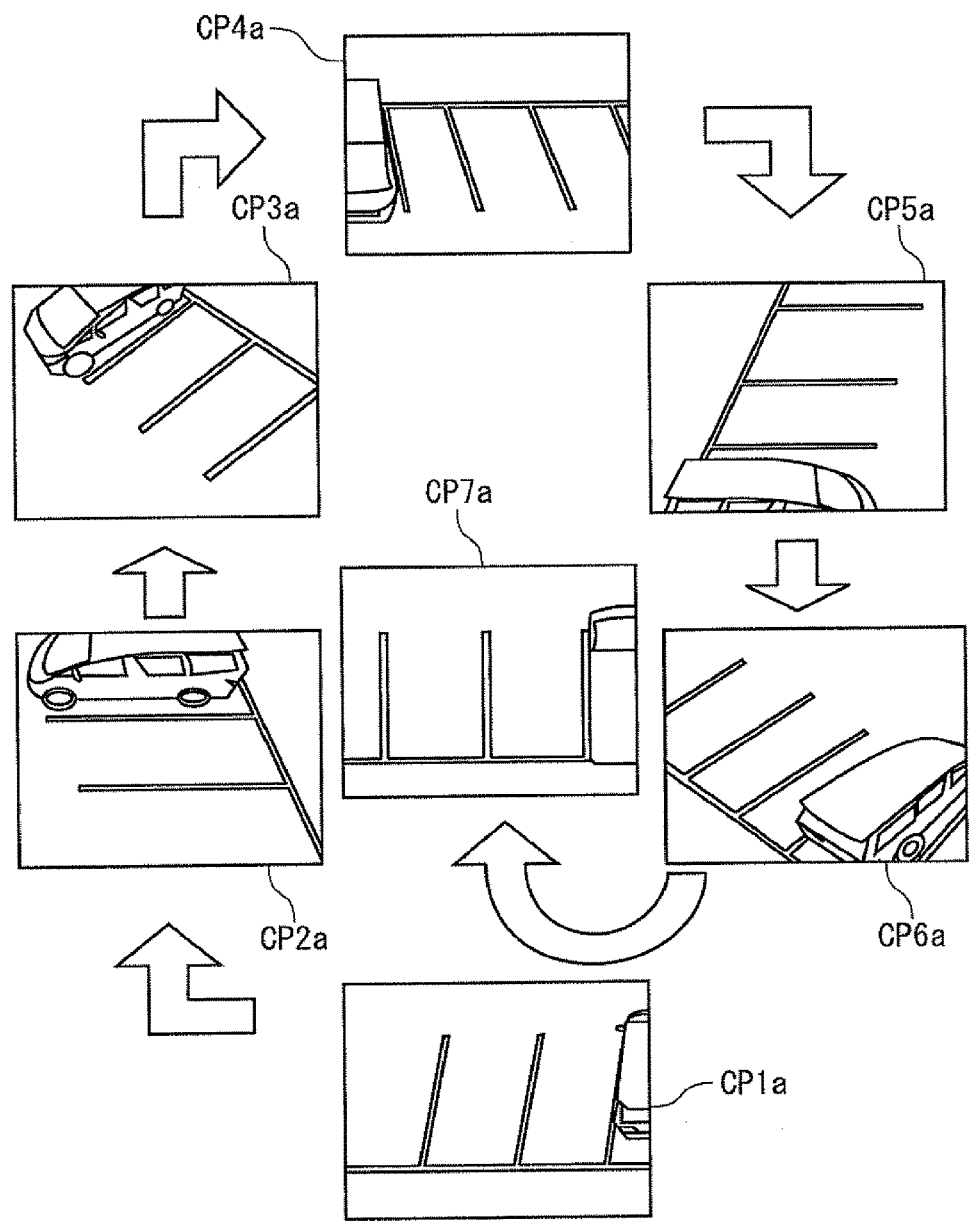
Figure 8:
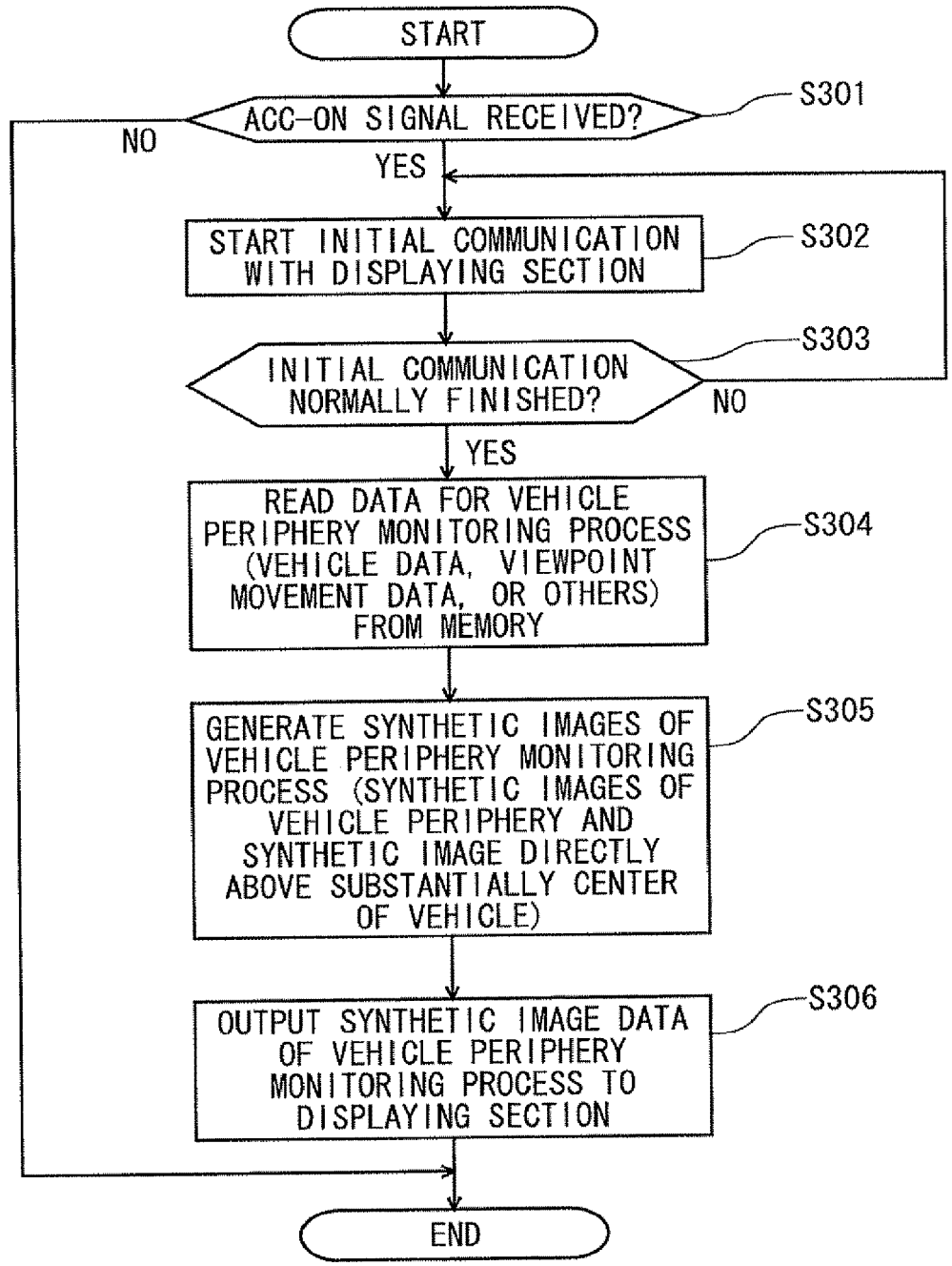
Figure 9:
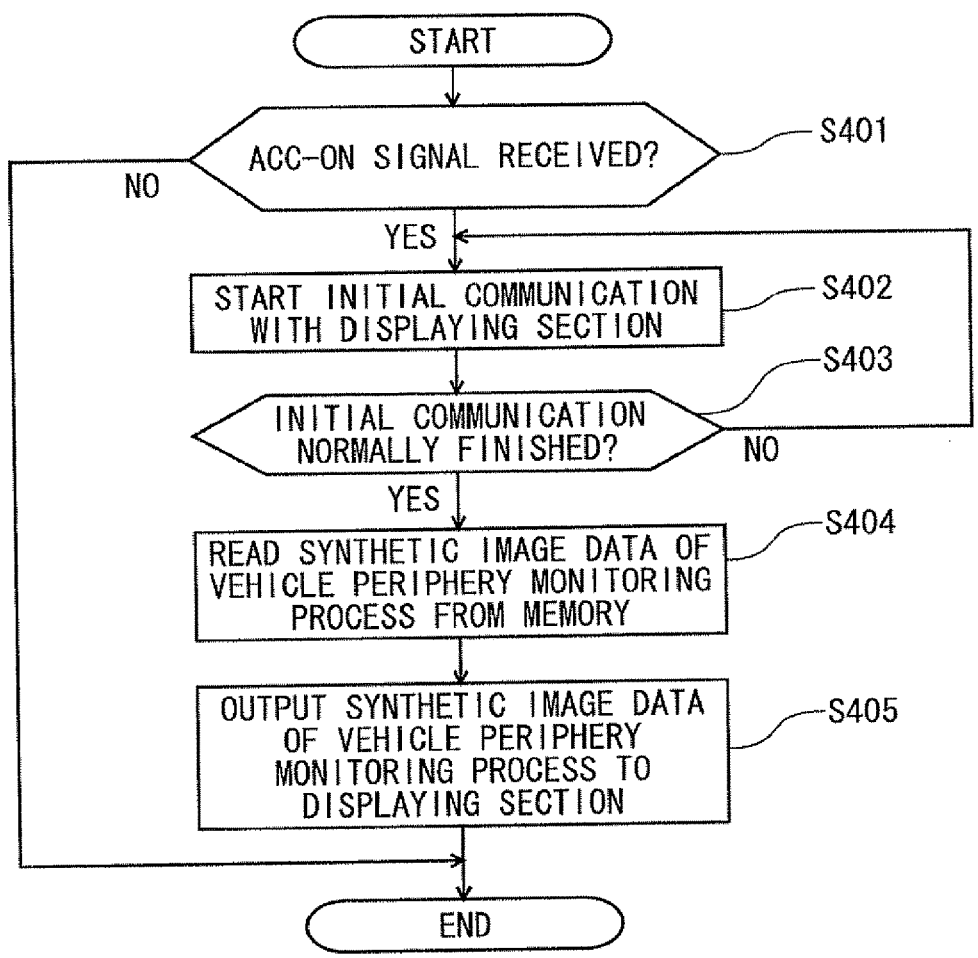
Figure 10:
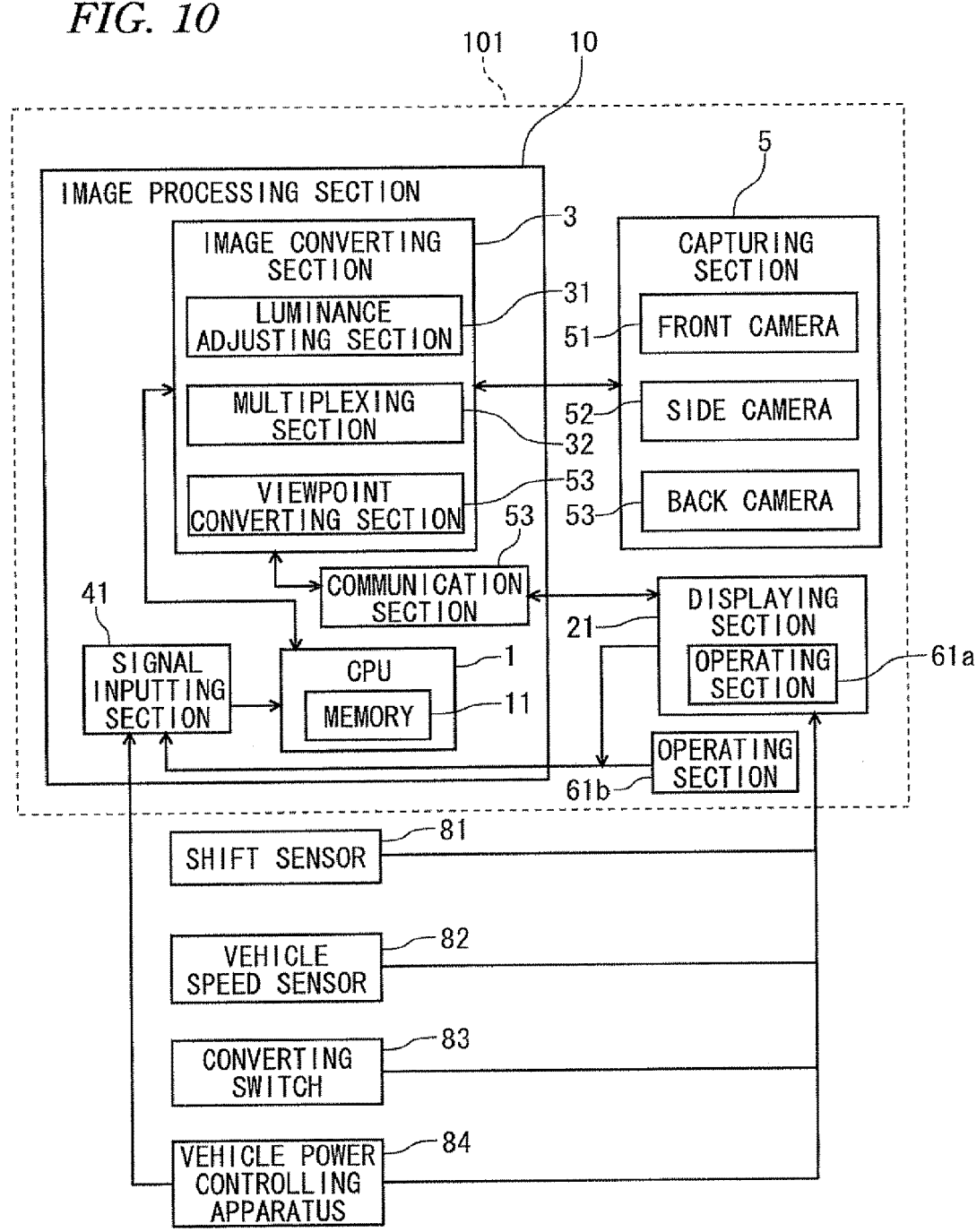
Figure 11:
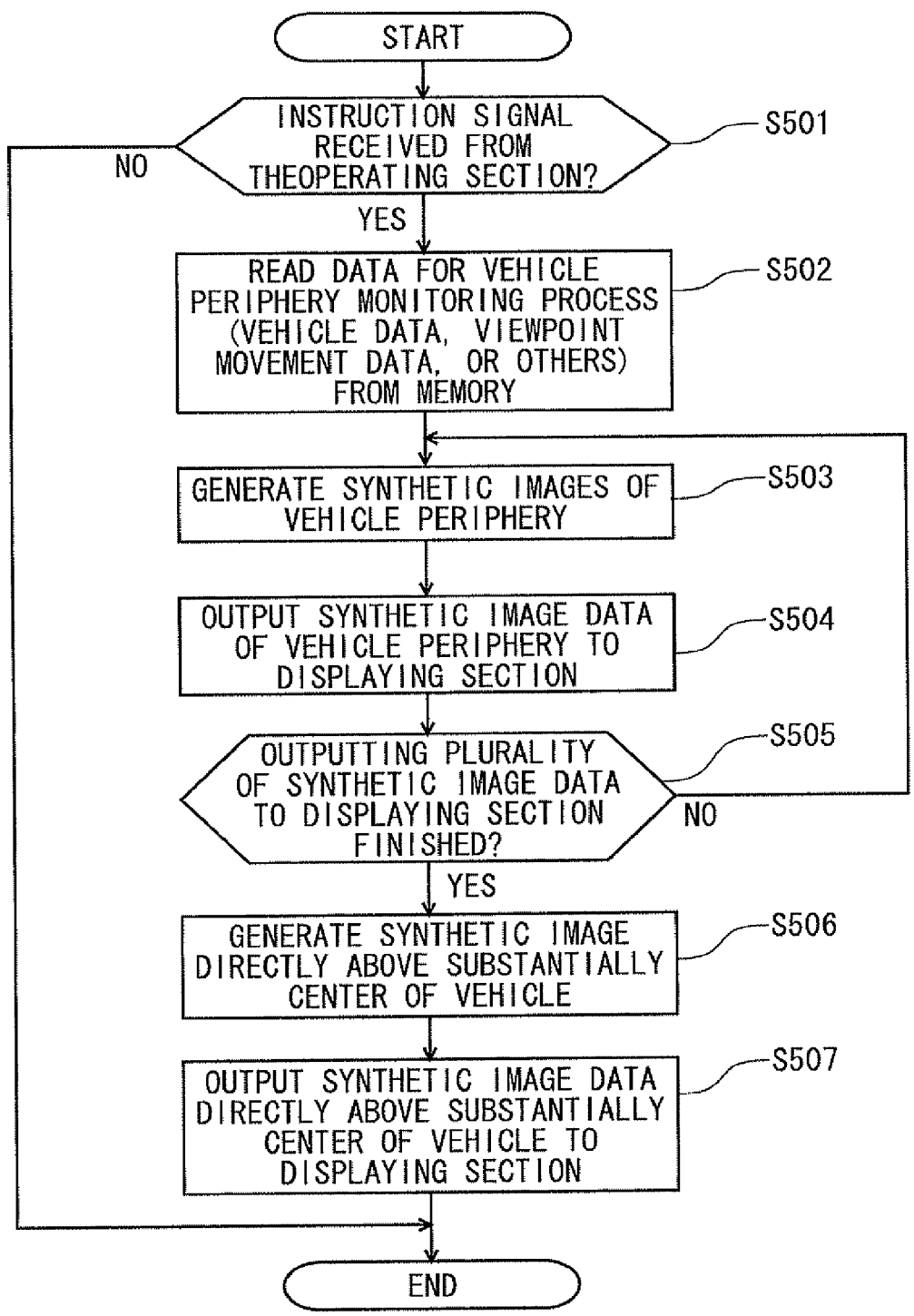
Figure 12:
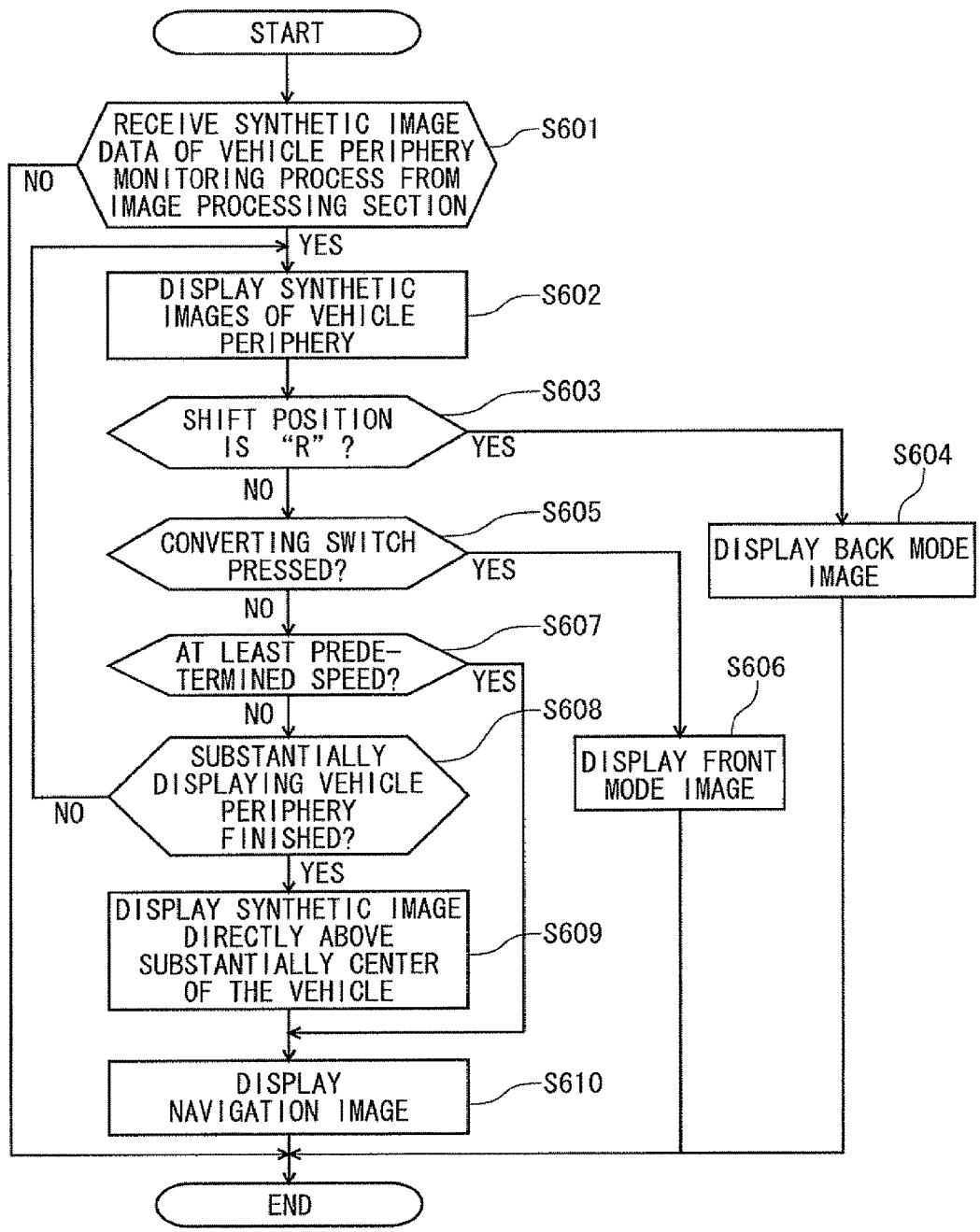
Figure 13:
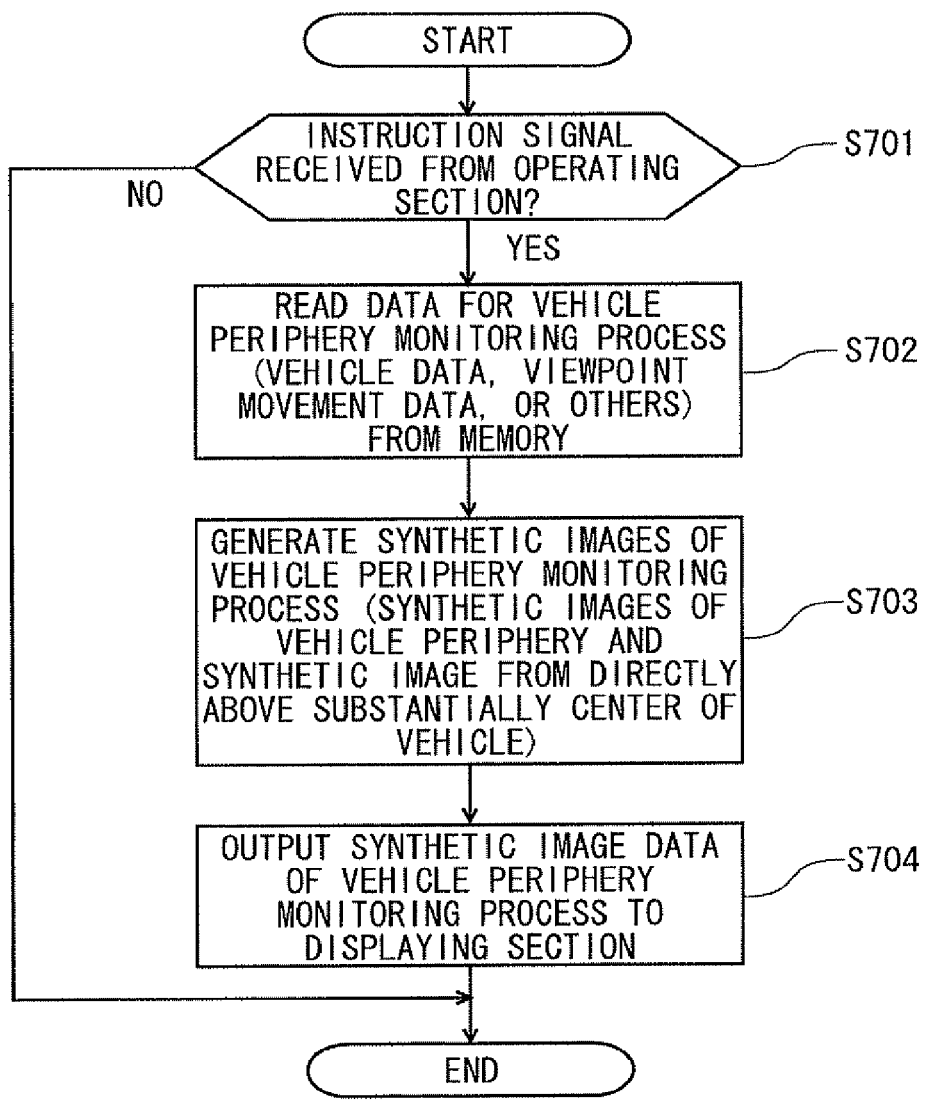
Figure 14:
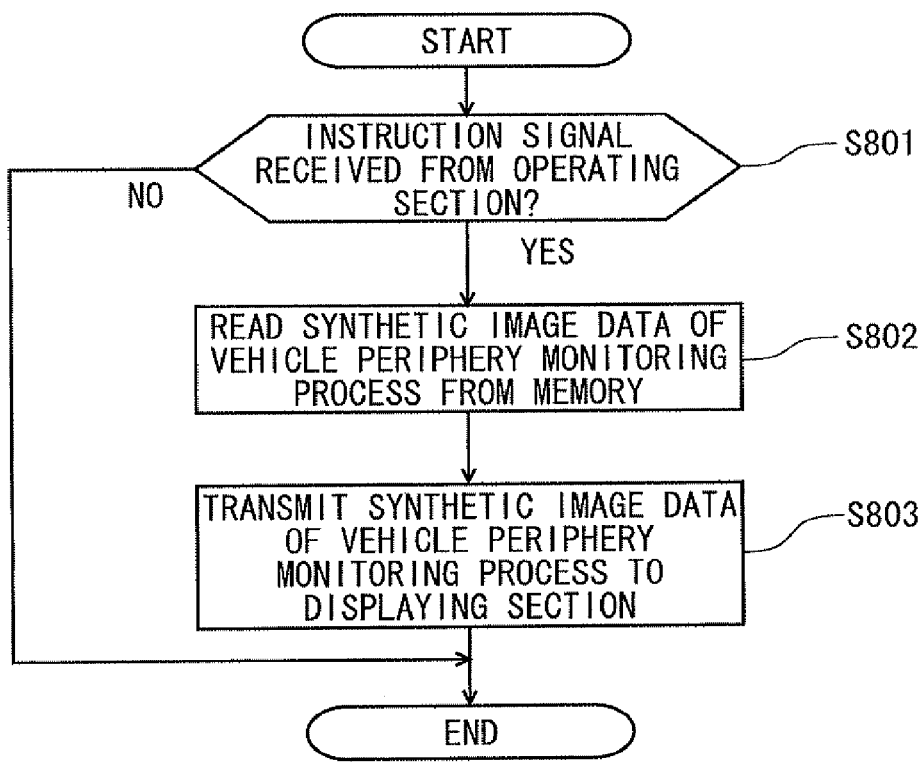

FIG. 1 is a block view of an image display system.
FIG. 2 is a view showing positions where a plurality of cameras to be mounted on a vehicle are disposed on the vehicle.
FIG. 3 is an explanatory view of a method for generating synthetic images viewed from a certain virtual viewpoint.
FIG. 4 is a view showing flow of processing of an image processing section.
FIG. 5 is a view showing image transition of synthetic images in a first embodiment.
FIG. 6 is a view showing flow of display processing of a displaying section.
FIG. 7 is a view showing image transition of synthetic images in a second embodiment.
FIG. 8 is a view showing a modified embodiment 1 of the processing of the image processing section.
FIG. 9 is a view showing a modified embodiment 2 of the processing of the image processing section.
FIG. 10 is a block view of an image display system of a third embodiment.
FIG. 11 is a view showing flow of the processing of the image processing section of a third embodiment.
FIG. 12 is a view showing image transition of synthetic images of the third embodiment.
FIG. 13 is a view showing a modified embodiment 1 of the processing of the image processing section of the third embodiment.
FIG. 14 is a view showing a modified embodiment 2 of the processing of the image processing section of the third embodiment.

THE BEST MODE TO CARRY OUT THE INVENTION

Hereinafter, embodiments of the present invention will be described with reference to drawings.
<1. First Embodiment>
<1-1. Configuration>
FIG. 1 is a block view of an image display system 100 of a first embodiment. The image display system 100 is an electronic apparatus mounted on a vehicle (a car in the first embodiment). The electronic apparatus has functions of capturing the periphery of the vehicle, generating images thereof, and displaying the images in the inside of the vehicle. A user who uses the image display system 100, i.e., a driver of the vehicle, can easily monitor the periphery of the vehicle.

As illustrated in FIG. 1, the image display system 100 includes an image processing section 10, and a capturing section 5 for capturing the periphery of the vehicle. The image display system 100 also includes a displaying section 21 such as a liquid crystal display, which is provided on an instrument panel or others thereby enabling the driver to see the screen of the displaying section 21. The image processing section 10 processes an image to be displayed on the displaying section 21. The capturing section 5 is electrically connected to the image processing section 10 and operated based on a signal from the image processing section 10. The displaying section 21 has a function of a touch panel and can receive various instructions from the user.

The capturing section 5 includes a front camera 51, a side camera 52, and a back camera 53, which are mounted on the vehicle. The vehicle mounting cameras 51, 52, and 53 include lenses and imaging elements and electronically acquire images.

FIG. 2 is a view showing positions where the vehicle mounting cameras 51, 52, and 53 are disposed on the vehicle 9. As illustrated in FIG. 2, the front camera 51 is provided substantially in a center of the left and the right of a front bumper 91 at the front end of the vehicle 9. An optical axis of the front camera 51 is toward a straight direction of the vehicle 9. The side cameras 52 are provided on left and right door mirrors 93, respectively. Optical axes of the side cameras 52 are toward an outside direction of the vehicle 9 to be orthogonal to the straight direction. The back camera 53 is provided substantially in a center of the left and the right of a rear bumper 92 at the rear end of the vehicle 9. An optical axis of the back camera 53 is directed toward a reverse direction of the straight direction of the vehicle 9.

For the lenses of the vehicle mounting cameras 51, 52, and 53, fish-eye lenses are adopted. The vehicle mounting cameras 51, 52, and 53 have at least 180° of an angle of view α. Accordingly, if the four vehicle mounting cameras 51, 52, and 53 are used, it is possible to capture the entire circumference of the vehicle 9.

Since the vehicle mounting cameras 51, 52, and 53 have at least 180° of an angle of view α, there are overlapping ranges β where ranges captured by the cameras overlap with one another. In the overlapping ranges, an identical object is displayed in different directions. Accordingly, in processing images of the overlapping ranges, images of two cameras may be displayed in the manner that they overlap with each other by adjusting a penetration ratio (e.g., 50%) of the overlapping portion of the images, or a certain range of the images may be removed from the overlapping portion.

Returning to FIG. 1, the image processing section 10 includes an image converting section 3 for processing captured an image acquired from the capturing section 5 and converting the image into a display image, a CPU 1 for carrying out various calculation processes, and a communication section 42 for communicating with the displaying section 21. An image generated in the image converting section 3 is outputted from the communication section 42 to the displaying section 21 to be displayed.

The image converting section 3 can generate a synthetic image viewed from a virtual viewpoint based on the plurality of captured images acquired from a plurality of vehicle mounting cameras 51, 52, and 53 of the capturing section 5. The image converting section 3 is configured by a hardware circuit including a luminance adjusting section 31 needed for the image processing, a multiplexing section 32, and a viewpoint converting section 33.

The luminance adjusting section 31 carries out gain adjustment of the captured images, with reference to average luminance indicating entire brightness of the captured images acquired from the capturing section 5. Specifically, if average luminance of the captured images is relatively high, a gain adjustment value is reduced. If average luminance of the captured images is relatively low, a gain adjustment value increases. Accordingly, in the case where a peripheral environment of the vehicle 9 is somewhat dark or other cases, the brightness of the captured images is adjusted.

The multiplexing section 32 synthesizes the plurality of captured images, which have been acquired from the plurality of vehicle mounting cameras 51, 52, and 53 and subjected to the gain adjustment, into one image to obtain a multiplexed image. The viewpoint converting section 33 generates a synthetic image viewed from a certain virtual viewpoint in the vicinity of the vehicle 9, by using the multiplexed image generated in the multiplexing section 32. How the viewpoint converting section 33 generates a synthetic image viewed from a virtual viewpoint will be described hereafter.

The CPU 1 functions as a controlling section for collectively controlling the sections of the image display system 100. The various controlling functions of the CPU 1 are realized by software in the manner that calculation processes are carried out in accordance with programs stored in advance in a memory 11 of the CPU 1 or others.

The image processing section 10 includes a signal inputting section 41 for inputting signals from various apparatuses provided in the vehicle 9. A signal from the outside of the image display system 100 is input to the CPU 1 through the signal inputting section 41. Specifically, in a vehicle power controlling apparatus 84, a signal of ACC-ON/OFF of the vehicle is input. ACC is a switch for ON/OFF of a supply line supplying power to components of the vehicle 9 including the image display system 100.

Signals indicating various information are input from a shift sensor 81, a vehicle speed sensor 82, a converting switch 83, a vehicle power controlling apparatus 84, and others to the displaying section 21. From the shift lever 81, shift positions such as "P," "D," "N," and "R" are input. From the vehicle speed sensor 82, a driving speed (km/h) of the vehicle 9 at that time is input. From the converting switch 83, a signal for converting camera images to be displayed on a display of the displaying section 21 is input. For example, an image of the front camera, images of the side cameras, and an image of the back camera are converted in this order. From the vehicle power controlling apparatus 84, a signal of ACC-ON/OFF of the vehicle is input. The ACC-ON/OFF signal of the vehicle from the vehicle power controlling apparatus 84 is also input to the CPU 1 of the image processing section 10 through the signal inputting section 41.

<1-2. Image Converting Processing>

Next, how the viewpoint converting section 33 of the image converting section 3 generates a synthetic image viewed from a certain virtual viewpoint based on the plurality of captured images acquired from the capturing section 5 will be described. FIG. 3 is an explanatory view of a method for generating a synthetic image viewed from a certain virtual viewpoint.

When the front camera 51, the side camera 52, and the back camera 53 of the capturing section 5 capture images at the same time, four captured images P1 to P4 presenting a front side, left and right sides, and a rear side of the vehicle 9, respectively, are acquired. That is, the four captured images P1 to P4 acquired from the capturing section 5 include information presenting the entire circumference of the vehicle 9 at the capturing time.

After the four captured images P1 to P4 are multiplexed, they are projected onto an imaginary three-dimensional curved surface SP by the viewpoint converting section 33. The three-dimensional curved surface SP is substantially in a hemisphere shape (bowl shape). The central part of the three-dimensional curved surface SP (a bottom part of a bowl) is set as a position of the vehicle 9. A corresponding relation between a position of each pixel included in the captured images P1 to P4 and a position of each pixel of the three-dimensional curved surface SP is predetermined. Accordingly, a value for each pixel of the three-dimensional curved surface SP can be determined based on the corresponding relation and a value for each pixel included in the captured images P1 to P4. The corresponding relation between a position of each pixel of the captured images P1 to P4 and a position of each pixel of the three-dimensional curved surface SP is stored as table data in the memory 11 included in the CPU 1 of the image processing section 10.

Meanwhile, virtual viewpoints such as VP1, VP2, VP5, and VP7 to the three-dimensional curved surface SP are set. In accordance with the set virtual viewpoints VP1, VP2, VP5 and VP7, a necessary area on the three-dimensional curved surface SP is cut out as an image, so that a synthetic image viewed from a certain virtual viewpoint is generated.

As illustrated in FIG. 5, in case of setting the virtual viewpoint VP1, which is the rear side of the vehicle 9, a synthetic image CP1 that appears to look down the vehicle 9 from the rear side of the vehicle 9 is generated. In case of setting the virtual viewpoint VP2, which is the left side surface of the vehicle 9, or the virtual viewpoint VP5, which is the right side surface of the vehicle 9, a synthetic image CP2 or CP5 that appears to look down the vehicle 9 from the left or right side surface of the vehicle 9 is generated. In case of setting the virtual viewpoint VP7 directly above the vehicle 9, a synthetic image CP7 that looks down the vehicle 9 from directly above the vehicle 9 is generated. The relation between the virtual viewpoint and the necessary area on the three-dimensional curved surface SP is predetermined and stored as table data in the memory 11 included in the CPU 1 of the image processing section 10.

When a synthetic image is actually generated, there is no need to determine values for all pixels of the three-dimensional curved surface SP. Values only for pixels of the necessary area in correspondence to the virtual viewpoint are determined based on the captured images P1 to P4, thereby increasing the processing speed. Preferably, an image of the vehicle 9 to be presented in a synthetic image is prepared in advance as data such as a bit map or others in the memory 11, such that the image of the vehicle 9 in the direction in accordance with the virtual viewpoint overlaps with a generated synthetic image.

Meanwhile, table data for the corresponding relation between a position of each pixel of the captured images P1 to P4 and a position of each pixel of the three-dimensional curved surface SP, table data for determination of the relation between the virtual viewpoint and the necessary area on the three-dimensional curved surface SP, and data stored in the memory 11 such as bit map data for an image of a vehicle can be rerecorded by other data. Although the memory 11 is provided in the inside of the CPU 1, the present invention is not limited to this embodiment. The memory 11 may be provided outside the CPU 1 or the image processing section 10.

<1-3. Operation>

Next, operation of the image processing section 10 of the first embodiment will be described with reference to FIG. 4, which is a view showing flow of processing of the image processing section 10, and FIG. 5, which is a view showing image transition of synthetic images in the first embodiment.

When the CPU 1 of the image processing section 10 receives an ACC-ON signal from the vehicle power controlling apparatus 84 through the signal inputting section 41 (Yes in S101), the communication section 42 of the image processing section 10 starts initial communication with the displaying section 21 (S102). The initial communication means a process for confirming whether or not communication between the image processing section 10 and the displaying section 21 is possible. If the CPU 1 of the image processing section 10 has not received the ACC-ON signal from the vehicle power controlling apparatus 84, the processing is finished (No in S101).

When the initial communication between the image processing section 10 and the displaying section 21 is normally finished (Yes in S103), the image processing section 10 reads data for carrying out the vehicle periphery monitoring process from the memory 11 of the CPU 1 (S104). Examples of the data for the vehicle periphery monitoring process include bit map data of the vehicle, viewpoint movement data (viewpoint positions by time or data for viewpoint directions), and others.

If the initial communication has not been normally finished (No in S103), the communication with the displaying section 21 is conducted once again. If the communication is impossible despite of several attempts for the communication, the processing is finished. The case where the initial communication is not normally finished includes the case where the image processing section 10 is not normally activated due to breakdown or other causes. In this case, the displaying section 21 may display a caution of the breakdown of the system for displaying images of the vehicle periphery.

After reading the data for the vehicle periphery monitoring process from the memory 11, the image converting section 3 of the image processing section 10 generates synthetic images of the vehicle periphery based on the read data (S105). Data for the prepared synthetic images are transmitted to the displaying section 21 (S106). The image processing section 10 transmits the data to the displaying section 21 in sequence such that the plurality of prepared synthetic images, in which a position of a virtual viewpoint sequentially varies, have continuity. The position of the virtual viewpoint sequentially varies such that the displaying section 21 can sequentially display images moving around the vehicle 9 in the state that the vehicle is looked down.

When transmitting the plurality of synthetic images to the displaying section 21 is finished (Yes in S107), a synthetic image directly above substantially a center of the vehicle 9 is generated (S108). The generated synthetic image directly above substantially a center of the vehicle 9 is transmitted to the displaying section 21 (S109).

When transmitting the plurality of synthetic image data to the displaying section 21 is not finished (No in S107), the processing returns to S105 to generate next synthetic images of the vehicle periphery.

Hereinafter, generating and displaying the plurality of synthetic images of the periphery of the vehicle 9, and generating and displaying the synthetic image directly above substantially a center of the vehicle 9 will be described based on FIG. 5.

The CP1 is a synthetic image that appears to look down the vehicle 9 from the rear side of the vehicle 9. The CP2 is a synthetic image that appears to look down the vehicle 9 from the left side surface of the vehicle 9. The CP3 is a synthetic image that appears to obliquely look down the vehicle 9 from the left side surface of the vehicle 9. The CP4 is a synthetic image that appears to look down the vehicle 9 from the front side of the vehicle 9. The CP5 is a synthetic image that appears to look down the vehicle 9 from the right side surface of the vehicle 9. The CP6 is a synthetic image that appears to obliquely look down the vehicle 9 from the right side surface of the vehicle 9. The CP7 is a synthetic image that appears to look down the vehicle 9 from directly above substantially a center of the vehicle 9. The image processing section 10 generates the plurality of synthetic images CP1 to CP6 being viewed to the vehicle 9 from a plurality of virtual viewpoints disposed around and above the vehicle 9, based on the images of the periphery of the vehicle 9 captured by the cameras 51, 52, and 53 of the capturing section 5. That is, the image processing section 10 generates the synthetic images CP1 to CP6 in sequence as if the user rotates around the vehicle 9 one time at the height of the user's eyes. Thereafter, the image processing section 10 generates the synthetic image CP7 being viewed to the vehicle 9 from a virtual viewpoint directly above substantially a center of the vehicle 9. After generating the synthetic image CP6, the image processing section 10 generates the synthetic image CP7 being viewed to the entire periphery of the vehicle 9 from a virtual viewpoint directly above substantially a center of the vehicle 9. The image processing section 10 sequentially outputs the plurality of generated synthetic images CP1 to CP7 to the displaying section 21 through the communication section 42 such that the virtual viewpoint moves in a circle in a continuous manner. Since the displaying section 21 displays the plurality of synthetic images presented to move around the vehicle in the state that the vehicle is looked down, the user monitors the entire circumference of the vehicle from the viewpoint where the user sees the vehicle in front of the user's eyes so that the user can intuitively recognize the positional relation between the vehicle and an obstacle from one screen.

The position of the virtual viewpoint moves in a continuous manner such that both the plurality of synthetic images presented to move in a circle around the vehicle and the synthetic image viewed from directly above substantially a center of the vehicle are displayed. Accordingly, the user can intuitively recognize the positional relation between the vehicle and an obstacle from one screen. Safety of the vehicle periphery can be confirmed from the plurality of viewpoints around and directly above substantially a center of the vehicle.

Even if there has been information about an obstacle or others that the user has overlooked from the images of the periphery of the vehicle, the safety can be confirmed again by the image of the top part of the vehicle that is sequentially displayed after the images of the periphery of the vehicle.

The user does not need to monitor the broad range of the entire circumference of the vehicle at once. The image of the broad range of the entire vehicle from directly above substantially a center of the vehicle is sequentially displayed after the images of the limited range of the vehicle periphery, so that the user can more surely confirm the safety of the vehicle periphery from one screen.

The synthetic images viewed from a virtual viewpoint moving in a circle in sequence around a position of the vehicle are generated, so that the user can intuitively recognize an obstacle around the entire circumference of the vehicle from one screen.

The synthetic images described herein are merely exemplary. The user may alter settings such as a height to look down the vehicle of the synthetic images, a direction, temporary stop of sequential display of synthetic images, adjustment of a rotation speed for sequential display, and reversing rotation for sequential display.

Sequentially displaying the synthetic images may be temporarily stopped such that a certain part of the screen of the displaying section is selected by user's operation thereby enlarging the selected part. In the first embodiment, after the synthetic images displaying the vehicle periphery are sequentially displayed, the synthetic image directly above substantially a center of the vehicle is sequentially displayed. However, the present invention is not limited to this sequence. After the synthetic image directly above substantially a center of the vehicle is displayed, the synthetic images of the vehicle periphery may be sequentially displayed.

The first embodiment has described moving around the vehicle one time from the position of the virtual viewpoint at the rear side of the vehicle. However, a position to initiate image transition is not defined and may be any position. The number of times of movement around the vehicle is not limited to one time and may be a certain number of times such as two or more times or half circle.

With respect to the condition to start the vehicle periphery monitoring process, the first embodiment describes that the image processing section 10 or the displaying section 21 receives an ACC-ON signal from the vehicle power controlling apparatus 84. Accordingly, the user can recognize the vehicle periphery when the image processing apparatus is activated. In general, the image processing apparatus is activated in response to ACC-ON prior to driving of the vehicle. Accordingly, the user can recognize the periphery of the vehicle prior to driving the vehicle. The condition to start the vehicle periphery monitoring process is not limited to receiving the ACC-ON signal, and may be continuously pressing the converting switch 83 for at least a predetermined time (for example, at least three seconds). Accordingly, the user can monitor the vehicle periphery at any time when he/she desires to automatically monitor the vehicle periphery.

A non-illustrated finish button may be provided on the displaying section 21 such that when the plurality of synthetic images are sequentially displayed, the finish button is pressed to finish sequentially displaying the synthetic images even during the process of sequentially displaying the synthetic images. Otherwise, a non-illustrated setting button may be provided, such that ACC-ON or the converting switch 83 is pressed in advance for at least a predetermined time to not start the vehicle periphery monitoring process.

When the vehicle periphery monitoring process is implemented such that the synthetic images are sequentially displayed, if a signal based on user's operation such as at least a predetermined vehicle speed, converting the shift position into "R," and pressing the converting SW is input to the displaying section 21, the vehicle periphery monitoring process is finished, and processing that corresponds to the user's operation is started as set forth hereinafter.

Next, the processing operation of the displaying section 21 will be described by using FIG. 6, which is a view showing flow of display processing of the displaying section 21. When the displaying section 21 receives an ACC-ON signal from the vehicle power controlling apparatus 84 (Yes in S201), the power of the body of the displaying section is ON (S202). If the displaying section 21 has not received the ACC-ON signal from the vehicle power controlling apparatus 84 (No in S201), the processing is finished.

Thereafter, the displaying section 21 starts initial communication with the image processing section 10, which has received an ACC-ON signal from the vehicle power controlling apparatus 84 like the displaying section 21 (S203). The initial communication means a process for confirming whether or not communication between the image processing section 10 and the displaying section 21 is possible. When the initial communication is normally finished (Yes in S204), the displaying section 21 receives data for the synthetic images of the vehicle periphery monitoring process from the image processing section 10 (S205).

If the initial communication has not been normally finished (No in S204), communication with the image processing section 10 is conducted once again. If the communication is impossible despite of several attempts for the communication, the processing is finished. The case where the initial communication is not normally finished includes the case where the image processing section 10 is not normally operated due to breakdown or other causes. In this case, the displaying section 21 may display a caution of the breakdown of the system for displaying images of the vehicle periphery.

While the displaying section 21 is receiving the synthetic image data from the image processing section 10, the displaying section 21 displays an opening screen (S206). After displaying the opening screen, the displaying section 21 sequentially displays the plurality of synthetic images of the vehicle periphery received from the image processing section 10 as described above with reference to FIG. 5 (S207). When a signal, in which the shift position has been converted into "R," is transmitted from the shift sensor 81 to the displaying section 21 while the displaying section 21 sequentially displays the plurality of synthetic images (Yes in S208), the displaying section 21 converts the screen sequentially displaying the synthetic images of the vehicle periphery into a screen displaying a back mode image to display an image captured from the rear side of the vehicle, and displays the converted screen (S209).

If the shift position has not been converted into "R" (No in S208), and the converting switch 83 has been pressed (Yes in S210), the displaying section 21 converts the screen sequentially displaying the synthetic images of the vehicle periphery into a screen displaying a front mode image to display an image captured from the front of the vehicle, and displays the converted screen (S211).

If the converting switch 83 has not been pressed (No in S210), and the vehicle speed is at least a predetermined speed (for example, at least 12 km/h) (Yes in S212), the displaying section 21 converts the screen sequentially displaying the synthetic images of the vehicle periphery into a screen displaying a navigation image, and displays the converted screen (S215). If the vehicle speed is not at least a predetermined speed (No in S212), it is determined whether or not sequentially displaying the synthetic images of the vehicle periphery has been finished (S213). If sequentially displaying the synthetic images has not been finished (No in S213), new synthetic images are transmitted from the image processing section 10 to the displaying section 21. The displaying section 21 displays the new synthetic images transmitted from the image processing section 10 such that the new synthetic images have continuity with the previous synthetic images.

When sequentially displaying the synthetic images of the vehicle periphery is finished (Yes in S213), the displaying section 21 displays the synthetic image directly above substantially a center of the vehicle 9 that has been transmitted from the image processing section 10 to the displaying section 21 (S214). Since the plurality of synthetic images presented to move around the vehicle in the state that the vehicle is looked down are displayed, the user can monitor the entire circumference of the vehicle from the viewpoint where the user sees the vehicle in front of the user's eyes, so that the user can intuitively recognize the positional relation between the vehicle and an obstacle from one screen.

After displaying the synthetic image directly above substantially a center of the vehicle 9, the displaying section 21 displays a screen displaying a navigation image (S215).

A direction of a virtual viewpoint moves in a continuous manner, such that the plurality of synthetic images presented to move in a circle around the vehicle and the synthetic image viewed from above the vehicle are displayed. Accordingly, the user can intuitively recognize the positional relation between the vehicle and an obstacle from one screen. Safety of the vehicle periphery can be confirmed from a plurality of viewpoints around and directly above substantially a center of the vehicle.

Even if there has been information about an obstacle or others that the user has overlooked from the images of the vehicle periphery, the safety can be confirmed again by the image directly above substantially a center of the vehicle that is sequentially displayed after the images of the vehicle periphery.

The user does not need to monitor the broad range of the entire circumference of the vehicle. The image of the broad range of the entire vehicle directly above substantially a center of the vehicle is sequentially displayed after the images of the limited range of the vehicle periphery, so that the user can more surely confirm safety of the vehicle periphery from one screen.

The synthetic images viewed from a virtual viewpoint moving in a circle in a continuous manner around a position of the vehicle are generated, so that the user can intuitively recognize an obstacle around the entire circumference of the vehicle from one screen.

The synthetic images described herein are exemplary. The user may alter settings such as a height to look down the vehicle of the synthetic images, a direction, temporary stop of sequential display of the synthetic images, adjustment of a rotation speed for sequential display, reversing rotation for sequential display, and others.

Sequentially displaying the synthetic images may be temporarily stopped such that a certain part of the screen of the displaying section is selected by user's operation thereby enlarging the selected part. In the first embodiment, after the synthetic images displaying the vehicle periphery are sequentially displayed, the synthetic image above the vehicle is sequentially displayed. However, the present invention is not limited to this sequence. After the synthetic image directly above substantially a center of the vehicle is displayed, the synthetic images of the vehicle periphery may be sequentially displayed.

The first embodiment has described moving in a circle around the vehicle one time from a position of a virtual viewpoint at the rear side of the vehicle. However, a position to initiate image transition is not defined and may be any position. The number of times of movement in a circle around the vehicle is not limited to one time and may be a certain number of times such as two or more times or half circle.

With respect to the condition to start the vehicle periphery monitoring process, the first embodiment describes that the image processing section 10 or the displaying section 21 receives an ACC-ON signal from the vehicle power controlling apparatus 84. Accordingly, the user can recognize the vehicle periphery when the image processing apparatus is activated. In general, the image processing apparatus is activated in response to ACC-ON prior to driving of the vehicle. Accordingly, the user can recognize the periphery of the vehicle prior to driving the vehicle. The condition to start the vehicle periphery monitoring process is not limited to receiving the ACC-ON signal and may be continuously pressing the converting switch 83 for at least a predetermined time (for example, at least three seconds). Accordingly, the user can monitor the vehicle periphery at any time when he/she desires to automatically monitor the vehicle periphery.

A non-illustrated finish button may be provided on the displaying section 21 such that when the plurality of synthetic images are sequentially displayed, the finish button is pressed to finish sequentially displaying the synthetic images even during the process of sequentially displaying the synthetic images. Otherwise, a non-illustrated setting button may be provided, such that ACC-ON or the converting switch 83 is pressed in advance for at least a predetermined time to not start the vehicle periphery monitoring process.

<2. Second Embodiment>

The basic configuration of the second embodiment is the same as that of the first embodiment. The second embodiment will be described with reference to FIG. 7 showing image transition of the synthetic images in the second embodiment. CP1a to CP7a in FIG. 7 are different from the sequentially displayed synthetic images CP1 to CP7 of the vehicle periphery illustrated in FIG. 5 in terms of a position of a viewpoint for generating the synthetic images of the periphery. In the second embodiment, in the state that a virtual viewpoint is moved on the left side of the vehicle, the image processing section 10 generates the synthetic images CP1a to CP7a of the periphery, and sequentially displays the synthetic images on the displaying section 21.

The CP1a is a synthetic image that appears to look down the vehicle 9 from a virtual viewpoint disposed at a position moved from the rear side of the vehicle 9 toward the left side of the vehicle 9 with a predetermined distance. The CP2a is a synthetic image that appears to look down the vehicle 9 from a virtual viewpoint disposed at a position moved from the left side surface of the vehicle 9 toward the left side of the vehicle 9 with a predetermined distance. The CP3a is a synthetic image that appears to obliquely look down the vehicle 9 from a virtual viewpoint disposed at a position moved from the left side surface of the vehicle 9 toward the left side of the vehicle 9 with a predetermined distance. The CP4a is a synthetic image that appears to look down the vehicle 9 from a virtual viewpoint disposed at a position moved from the front surface of the vehicle 9 toward the left side of the vehicle 9 with a predetermined distance. The CP5a is a synthetic image that appears to look down the vehicle 9 from a virtual viewpoint disposed at a position moved from the right side surface of the vehicle 9 toward the left side of the vehicle 9 with a predetermined distance. The CP6a is a synthetic image that appears to look down the vehicle 9 from a virtual viewpoint disposed at a position moved from the right side surface of the vehicle 9 toward the left side of the vehicle 9. The CP7a is a synthetic image that appears to look down the vehicle 9 from a virtual viewpoint moved from a virtual viewpoint directly above substantially a center of the vehicle 9 toward the left side of the vehicle 9 with a predetermined distance.

As described, the position of the virtual viewpoint in sequential display of the synthetic images is moved from the vehicle with a predetermined distance, such that the position of the virtual viewpoint is converted within a scope that even partially includes images of the vehicle. In this way, it is possible to select and display a portion that the user desires to monitor. For example, if the user sits on the driver's seat (right side seat) and desires to primarily monitor the left side, as set forth above, it is possible to generate synthetic images based on a viewpoint at a position moved from the vehicle toward the left side of the vehicle with a predetermined distance, and sequentially display the synthetic images. A position of a virtual viewpoint may be manually altered by the user. It is possible to sequentially display synthetic images based on a certain position where the user desires to monitor within the scope that includes images of the vehicle. Accordingly, the user can monitor circumferences around a position where the user desires to primarily monitor, so that the user can intuitively recognize the positional relation between the vehicle and an obstacle from one screen.

The position of the virtual viewpoint is transited in a continuous manner, such that both the plurality of synthetic images presented to move in a circle around the periphery moved from the vehicle with a predetermined distance, and the synthetic image moved from a virtual viewpoint directly above substantially a center of the vehicle with a predetermined distance are displayed. Accordingly, the user can intuitively recognize the positional relation between the vehicle and an obstacle from one screen. Safety of the vehicle periphery can be confirmed from a plurality of virtual viewpoints including virtual viewpoints of the periphery moved from the vehicle with a predetermined distance and the virtual viewpoint moved from directly above substantially a center of the vehicle with a predetermined distance.

Even if there has been information about an obstacle or others that the user has overlooked from the images of the periphery moved from the vehicle with a predetermined distance, the safety can be confirmed again by the image moved from a virtual viewpoint directly above substantially a center of the vehicle with a predetermined distance to be sequentially displayed after the synthetic images of the periphery moved from the vehicle with a predetermined distance.

There is no need to monitor the broad range being viewed to the position moved from the vehicle with a predetermined distance from directly above at once. The broad range of the image moved from the virtual viewpoint directly above substantially a center of the vehicle with a predetermined distance is sequentially displayed after the limited range of the images of the periphery moved from the vehicle with a predetermined distance are displayed, so that the user can more surely confirm safety of the vehicle periphery from one screen.

<3. Image Processing Section; Modified Embodiment>

<3-1. Modified Embodiment 1>

Next, a modified embodiment of the processing of the image processing section 10 that has been described with reference to FIG. 4 will be described.

In FIG. 4, each time a plurality of synthetic images from different virtual viewpoints are generated, the synthetic images are transmitted to the displaying section 21. However, in the modified embodiment 1, the plurality of synthetic images are generated, and thereafter, transmitted to the displaying section 21.

FIG. 8 is a view showing an example of the processing of the image processing section 10 of the modified embodiment 1. When the CPU 1 of the image processing section 10 receives an ACC-ON signal, which is an instruction signal to implement the instruction to output images to the displaying section 21, from the vehicle power controlling apparatus 84 (Yes in S301), the communication section 42 of the image processing section 10 starts initial communication with the displaying section 21 (S302). The initial communication means a process for confirming whether or not communication between the image processing section 10 and the displaying section 21 is possible. If the CPU 1 of the image processing portion 10 has not received the ACC-ON signal from the vehicle power controlling apparatus 84, the processing is finished (No in S301).

When the initial communication between the image processing section 10 and the displaying section 21 is normally finished (Yes in S303), the CPU 1 reads data for carrying out the vehicle periphery monitoring process from the memory 11 (S304). Examples of the data for carrying out the vehicle periphery monitoring process include parameter data such as bit map data of the vehicle, and viewpoint movement data (viewpoint positions by time or data of viewpoint directions).

If the initial communication has not been normally finished (No in S303), the communication with the displaying section 21 is conducted once again. If the communication is impossible despite of several attempts for the communication, the processing is finished. The case where the initial communication is not normally finished includes the case where the image processing section 10 is not normally activated due to breakdown or other causes. In that case, the displaying section 21 may display a caution of the breakdown of the system for displaying the images of the vehicle periphery.

Returning to S304, after reading the data for the vehicle periphery monitoring process from the memory 11, the image converting section 3 of the image processing section 10 generates synthetic images for the vehicle periphery monitoring process based on the read data (S305). The synthetic images for the vehicle periphery monitoring process mean synthetic images around and directly above substantially a center of the vehicle 9.

Data for the prepared synthetic images of the vehicle periphery monitoring process are output to the displaying section 21 (S306). The image processing portion 10 arranges the data in sequence such that the plurality of prepared synthetic images, in which a position of a virtual viewpoint sequentially varies, have continuity. The data are output to the displaying section 21.

Accordingly, the position of the virtual viewpoint sequentially varies such that the displaying section 21 can display images moving in a continuous manner around the vehicle 9 in the state that the vehicle 9 is viewed from the virtual viewpoint around and above the vehicle 9. The synthetic image around the vehicle 9 and the plurality of synthetic images directly above substantially a center of the vehicle 9 are output to the displaying section 21 at the same timing, so that among the synthetic images that sequentially vary and are sequentially displayed, predetermined images may be skipped, and next images are displayed or the previous images may be displayed again. Accordingly, among the sequentially displayed images, images of a portion where the user desires to monitor can be quickly displayed.

<3-2. Modified Embodiment 2>

In FIG. 4, each time a plurality of synthetic images from different virtual viewpoints are generated, the synthetic images are transmitted to the displaying section 21. However, in the modified embodiment 4, a plurality of synthetic images that have already been generated and stored in the memory 11 are transmitted to the displaying section 21 in response to an ACC-ON signal.

FIG. 9 is a view showing an example of the processing of the image processing section 10 of the modified embodiment 2. When the CPU 1 of the image processing section 10 receives an ACC-ON signal, which is an instruction signal to implement the instruction to output images to the displaying section 21, from the vehicle power controlling device 84 through the signal inputting section 41 (Yes in S401), the communication section 42 of the image processing section 10 starts initial communication with the displaying section 21 (S402). The initial communication means a process for confirming whether or not communication between the image processing section 10 and the displaying section 21 is possible. If the CPU 1 of the image processing section 10 has not received the ACC-ON signal from the vehicle power controlling device 84 (No in S401), the processing is finished.

When the initial communication between the image processing section 10 and the displaying section 21 is normally finished (Yes in S403), the CPU 1 reads synthetic image data for the vehicle periphery monitoring process from the memory 11 (S404). The synthetic image data are synthetic images generated by the image converting process, based on a plurality of images captured by the plurality of cameras of the capturing section 5 for capturing the periphery of the vehicle 9 before receiving an ACC-ON signal, and stored in advance in the memory 11.

In S404, after the synthetic image data for the vehicle periphery monitoring process stored in advance in the memory 11 are read from the memory 11, the synthetic image data for the vehicle periphery monitoring process are output to the displaying section 21 (S405).

Accordingly, the synthetic data for the vehicle periphery monitoring process can be output to the displaying section 21 immediately when the CPU 1 of the image processing section 10 receives an ACC-ON signal, which is an instruction signal to implement the instruction to output images to the displaying section 21. As a result, time for outputting the synthetic image data to the displaying section 21 after receiving the instruction signal can be reduced.

If the initial communication has not been normally finished (No in S403), the communication with the displaying section 21 is conducted once again. If the communication is impossible despite of several attempts for the communication, the processing is finished. The case where the initial communication is not normally finished includes the case where the image processing section 10 does not normally operate due to breakdown or other causes. In this case, the displaying section 21 may display a caution of the breakdown of the system for displaying image of the vehicle periphery.

<4. Third Embodiment>

Next, a third embodiment will be described. In the first embodiment, an ACC-ON signal is an instruction signal. In response to the instruction signal, a plurality of synthetic images from different positions of virtual viewpoints are transmitted. In the third embodiment, a signal based on user's operation is an instruction signal. A plurality of synthetic images are transmitted in response to user's operation.

<4-1. Configuration>

FIG. 10 is a block view of the image display system 101 of the third embodiment. The basic configuration of the third embodiment is substantially the same as that of the first embodiment. The configuration illustrated in FIG. 10 is different from that in FIG. 1 only in that the displaying section of FIG. 10 includes an operating section 61a and an operating section 61b.

The operating section 61a is configured by a touch switch formed of a transparent electrode on a display screen of the displaying section 21, a hard switch provided and fixed around the displaying section 21, and others. An instruction signal by user's operation is transmitted to the CPU 1 through the signal inputting section 41. When the CPU 1 receives the instruction signal, the image processing section 10 generates synthetic images and outputs the synthetic images to the displaying section 21 as set forth hereafter.

Specific examples of the synthetic images include images, which are viewed from a virtual viewpoint around and above the vehicle 9 toward the direction of the vehicle 9, and generated based on the plurality of images acquired from the plurality of cameras (front camera 51, side cameras 52, and back camera 53) of the capturing section 5 for capturing the periphery of the vehicle 9. Other specific examples of the synthetic images include an image viewed from a virtual viewpoint directly above substantially a center of the vehicle 9.

The operating section 61b is a fixed switch integrally provided in the image processing system 101. A user operates the operating section 61b such that an instruction signal is transmitted to the CPU 1 through the signal inputting section 41. When CPU 1 receives the instruction signal, the image processing section 10 generates synthetic images and outputs the synthetic images to the displaying section 21 as set forth hereafter. The operating section 61b may be a remote controller enabling remote operation or a combination of the fixed switch and the remote controller. In FIG. 10, the other configuration of the image processing system 101 is the same as the configuration described for the image processing system 100 of FIG. 1.

<4-2. Operation>

FIG. 11 is a view showing flow of the processing of the image processing section of the third embodiment.

When the CPU 1 of the image processing section 10 receives an instruction signal from the operating section 61a or the operating section 61b through user's operation (Yes in S501), the CPU 1 reads data for carrying out the vehicle periphery monitoring process from the memory 11 (S502). Examples of the data for the vehicle periphery monitoring process include vehicle bit map data, viewpoint movement data (viewpoint positions by time or data for viewpoint directions), or others.

If the CPU 1 of the image processing section 10 has not received an instruction signal from the operating section 61a or the operating section 61b (No in S501), the processing is finished.

After the data for the vehicle periphery monitoring process are read from the memory 11, the image converting section 3 of the image processing section 10 generates synthetic images of the vehicle periphery based on the read data (S503). Data for the prepared synthetic images are output to the displaying section 21 (S504). The image processing section 10 outputs the plurality of prepared synthetic images, in which a position of a virtual viewpoint sequentially varies, to the displaying section 21 in sequence such that the synthetic images have continuity. Accordingly, the position of the virtual viewpoint sequentially varies such that the displaying section 21 can display images moving in a continuous manner around the vehicle in the state that the vehicle 9 is viewed from a virtual viewpoint around and above the vehicle 9.

When outputting the plurality of synthetic images to the displaying section 21 is finished (Yes in S505), the synthetic image directly above substantially a center of the vehicle 9 is generated (S506). The generated synthetic image directly above substantially a center of the vehicle 9 is output to the displaying section 21 (S507).

In S505, if outputting the plurality of synthetic image data to the displaying section 21 has not been finished (No in S505), the processing returns to S503 to carry out the process for generating next synthetic images of the periphery of the vehicle 9.

Next, the processing operation of the displaying section 21 will be described with reference to FIG. 12 showing image transition of synthetic images in the third embodiment. When the displaying section 21 receives synthetic image data for the vehicle periphery monitoring process from the image processing section 10 (Yes in S601), the displaying section 21 sequentially displays a plurality of synthetic images of the periphery of the vehicle 9 that have been received from the image processing section 10 (S602).

If the synthetic image data for the vehicle periphery monitoring process have not been received from the image processing section 10 (No in S601), the processing is finished.

If a signal, in which the shift position has been converted into "R," is transmitted from the shift sensor 81 to the displaying section 21 during the process of sequentially displaying the plurality of synthetic images (Yes in S603), as a result of the processing of S602, the displaying section 21 converts the screen sequentially displaying the synthetic images of the periphery of the vehicle 9 into a back mode image display screen for displaying images captured from the rear side of the vehicle 9 and displays the converted screen (S604).

If the shift position has not been converted into "R" (No in S603), and the converting switch 83 has been pressed (Yes in S605), the displaying section 21 converts the screen sequentially displaying the synthetic images of the periphery of the vehicle 9 into a front mode image display screen for displaying images captured from the front side of the vehicle 9 (S606).

In S605, if the converting switch 83 has not been pressed (No in S605), and the vehicle speed is at least a predetermined speed (e.g., at least 12 km/h), the displaying section 21 converts the screen sequentially displaying the synthetic images of the periphery of the vehicle 9 into the screen displaying a navigation image and displays the navigation image (S610).

If the vehicle speed is not at least a predetermined speed (No in S607), it is determined whether or not sequentially displaying the synthetic images of the periphery of the vehicle 9 has been finished (S608). If sequentially displaying the synthetic images of the periphery of the vehicle 9 has not been finished (No in S608), new synthetic images are transmitted from the image processing section 10 to the displaying section 21. The displaying section 21 displays the new synthetic images transmitted from the image processing section 10 to have continuity with the previous synthetic images.

If sequentially displaying the synthetic images of the periphery of the vehicle 9 has been finished (Yes in S608), the displaying section 21 displays the synthetic images directly above substantially a center of the vehicle 9 transmitted from the image processing section 10 to the displaying section 21 (S609). Since the displaying apparatus displays the plurality of synthetic images presented to move around the vehicle in the state that the vehicle is looked down, the user can monitor the entire circumference of the vehicle from the viewpoint where the user sees the vehicle in front of his/her eyes, so that the user can intuitively recognize the positional relation between the vehicle and an obstacle from one screen.

In S609, after displaying the synthetic images directly above substantially a center of the vehicle 9, the displaying section 21 displays a screen displaying a navigation image (S610).

The direction of the virtual viewpoint moves in a continuous manner such that both the plurality of synthetic images presented to move in a circle around the vehicle and the synthetic image viewed from above the vehicle are displayed. Accordingly, the user can intuitively recognize the positional relation between the vehicle and an obstacle from one screen. Safety of the periphery of the vehicle 9 can be confirmed from the plurality of viewpoints around and directly above substantially a center of the vehicle 9.

Even if there has been information about an obstacle or others that the user has overlooked from the images of the periphery of the vehicle 9, the safety can be confirmed again by the image directly above substantially a center of the vehicle 9 that is sequentially displayed after the images of the periphery of the vehicle 9.

The user does not need to monitor the broad range of the entire circumference of the vehicle 9. After the images of the limited range of the periphery of the vehicle 9, the image of the broad range of the entire vehicle directly above substantially a center of the vehicle 9 is sequentially displayed so that the user can more surely confirm the safety of the periphery of the vehicle 9.

The synthetic images viewed from a virtual viewpoint moving in a continuous manner around a position of the vehicle 9 are generated, such that the user can intuitively recognize an obstacle around the entire circumference of the vehicle 9 from one screen.

The synthetic images described herein are exemplary. The user may alter settings such as a height to look down the vehicle of the synthetic images, temporary stop of sequential display of the synthetic images, adjustment of a rotation speed for sequential display, and reversing rotation for sequential display.

Sequentially displaying synthetic images may be temporarily stopped such that a certain part of the screen of the displaying section is selected by user's operation thereby enlarging the selected part. In the third embodiment, after the synthetic images displaying the vehicle periphery are sequentially displayed, the synthetic image above the vehicle is sequentially displayed. However, the present invention is not limited to this sequence. After the synthetic image directly above substantially a center of the vehicle is displayed, the synthetic images of the vehicle periphery may be sequentially displayed.

The third embodiment has described moving in a circle around the vehicle one time from a position of a virtual viewpoint at the rear side of the vehicle. However, a position to initiate image transition is not defined and may be any position. The number of times of movement in a circle around the vehicle is not limited to one time and may be a certain number of times such as two or more times or half circle.

With respect to the condition to start the vehicle periphery monitoring process, the third embodiment describes that the image processing section 10 receives an instruction signal from the operating section 61*a* or the operating section 61*b* through user's operation. Accordingly, the user can monitor the periphery of the vehicle 9 whenever he/she desires to monitor the periphery of the vehicle 9.

A non-illustrated finish button may be provided on the displaying section 21 such that when the plurality of synthetic images are sequentially displayed, the finish button is pressed to finish sequentially displaying the synthetic images even during the process of sequentially displaying the synthetic images. Otherwise, the operating section 61*a* or the operating section 61*b* is pressed for at least a predetermined time to not start the vehicle periphery monitoring process.

<4-3. Modified Embodiment 1>

Next, a modified embodiment of the image processing section of the third embodiment will be described.

In the modified embodiment 1, a plurality of synthetic images are generated, and thereafter transmitted to the displaying section 21. FIG. 13 is a view showing an example of the processing of the image processing section in this case. When the CPU 1 of the image processing section 10 receives an instruction signal from the operating section 61*a* or the operating section 61*b* through user's operation (Yes in S701), the CPU 1 reads data for carrying out the vehicle periphery monitoring process from the memory 11 (S702). Examples of the data for the vehicle periphery monitoring process include vehicle bit map data, viewpoint movement data (viewpoint positions by time or data of viewpoint directions), and others.

After reading the data for the vehicle periphery monitoring process from the memory 11, the image converting section 3 of the image processing section 10 generates synthetic images for the vehicle periphery monitoring process based on the read data (S703). The synthetic images for the vehicle periphery monitoring process mean synthetic images around and directly above substantially a center of the vehicle 9.

In S703, data for the prepared synthetic images of the vehicle periphery monitoring process are output to the display section 21 (S074). Meanwhile, the image processing section 10 arranges the data in sequence such that the plurality of prepared synthetic images, in which a virtual viewpoint sequentially varies, have continuity, and outputs the data to the displaying section 21.

Accordingly, the position of the virtual viewpoint sequentially varies such that images sequentially moving around the vehicle 9 in a continuous manner in the state that the vehicle is viewed from the virtual viewpoint around and above the vehicle can be displayed on the displaying section 21. The synthetic image around the vehicle 9 and the plurality of synthetic images directly above substantially a center of the vehicle 9 are output to the displaying section 21 at the same timing, so that among the synthetic images that sequentially vary and are sequentially displayed, predetermined images can be skipped, and next images are displayed or the previous images may be displayed again. Accordingly, among the sequentially displayed images, images of a portion where the user desires to monitor can be quickly displayed.

<4-4. Modified Embodiment 2>

In the embodiment 2, a plurality of synthetic images generated in advance and stored in the memory 11 are transmitted to the displaying section 21 in response to an instruction signal. FIG. 14 is a view showing a modified embodiment of the processing of the image processing section of the third embodiment. When the CPU 1 of the image processing section 10 receives an instruction signal from the operating section 61*a* or the operating section 61*b* through user's operation (Yes in S801), the image processing section 10 reads synthetic image data for the vehicle periphery monitoring process from the memory 11 (S802). The synthetic image data are synthetic images generated by the image converting process based on the plurality of images captured by the plurality of cameras of the capturing section 5 for capturing the periphery of the vehicle 9 before receiving an ACC-ON signal, and stored in advance in the memory 11.

If the CPU 1 has not received an instruction signal from the operating section 61*a* or the operating section 61*b* through user's operation, the processing is finished (No in S801).

Returning to S802, after synthetic image data for the vehicle periphery monitoring process stored in advance in the memory 11 are read from the memory 11, the synthetic image data for the vehicle periphery monitoring process are output to the displaying section 21 (S803).

Accordingly, the synthetic data for the vehicle periphery monitoring process can be output to the displaying section 21 immediately when the CPU 1 of the image processing section 10 receives an ACC-ON signal, which is an instruction signal to implement the instruction to output images to the displaying section 21. As a result, time for outputting the synthetic image data to the displaying section 21 after receiving the instruction signal can be reduced.

The present invention is based on Japanese patent application (Japanese Patent Application No. 2009-130102) filed on May 29, 2009 and Japanese patent application (Japanese Patent Application No. 2010-052210) filed on Mar. 9, 2010, the disclosures of which are herein incorporated by reference.

DESCRIPTION OF REFERENCE NUMERALS 100 image processing system
10 image processing section
5 capturing section
21 displaying section
83 converting switch
84 vehicle power controlling apparatus

The invention claimed is:

1. An image processing apparatus that processes an image to be displayed on a display apparatus mounted on a vehicle, the image processing apparatus comprising:
a receiving section that receives an instruction signal;
a synthetic image generating section that generates a plurality of first synthetic images based on a plurality of images of a periphery of the vehicle captured by a plurality of cameras which are provided so as to be capable of capturing a 360° view of the periphery of the vehicle, the first synthetic images being viewed towards the vehicle from a plurality of virtual viewpoints disposed around the vehicle; and
an output section that sequentially outputs the first synthetic images to the display apparatus so that the virtual viewpoint of the first synthetic images moves in a circle around the vehicle at an angle that is less than 360° while being directed towards the vehicle in response to the instruction signal.

2. The image processing apparatus as set forth in claim 1, wherein the synthetic image generating section generates a second synthetic image being viewed towards the vehicle from a virtual viewpoint disposed above the vehicle,
wherein the output section sequentially outputs the first synthetic images and the second synthetic image to the display apparatus such that the virtual viewpoint moves in a continuous manner between the first synthetic images and the second synthetic image.

3. The image processing apparatus as set forth in claim 2, wherein the output section outputs the second synthetic image after outputting the first synthetic images.

4. The image processing apparatus as set forth in claim 1, wherein the synthetic image generating section generates the first synthetic images such that the virtual viewpoint moves in a circle around a position of the vehicle.

5. The image processing apparatus as set forth in claim 1, wherein the synthetic image generating section generates the first synthetic images such that the virtual viewpoint moves in a circle around a user-specified position in the vicinity of the vehicle.

6. The image processing apparatus as set forth in claim 1, wherein the receiving section receives the instruction signal when the image processing apparatus is activated by a predetermined user operation.

7. The image processing apparatus as set forth in claim 5, further comprising the display apparatus that displays the first synthetic image output from the output section.

8. An image processing method for processing an image to be displayed on a display apparatus mounted on a vehicle, the image processing method comprising:
receiving an instruction signal;
generating a plurality of synthetic images based on a plurality of images of a periphery of the vehicle captured by a plurality of cameras which are provided so as to be capable of capturing a 360° view of the periphery of the vehicle, the synthetic images being viewed towards the vehicle from a plurality of virtual viewpoint disposed around the vehicle; and
sequentially outputting the synthetic images to the display apparatus so that the virtual viewpoint of the synthetic images circle in a sequence around the vehicle at an angle that is less than 360° while being directed towards the vehicle in response to the instruction signal.

9. An electronic apparatus that processes an image to be displayed on a display apparatus mounted on a vehicle, the electronic apparatus comprising:
an operation section that outputs an instruction signal;
a receiving section that receives the instruction signal;
a synthetic image generating section that generates a plurality of first synthetic images based on a plurality of images of a periphery of the vehicle captured by a plurality of cameras which are provided so as to be capable of capturing a 360° view of the periphery of the vehicle, the first synthetic images being viewed towards the vehicle from a plurality of virtual viewpoints disposed around the vehicle; and
an output section that sequentially outputs the first synthetic images to the display apparatus so that the virtual viewpoint of the first synthetic images moves in a circle around the vehicle at an angle that is less than 360° while being directed towards the vehicle in response to the instruction signal.

* * * * *